(12) United States Patent
Woodland

(10) Patent No.: US 10,958,569 B2
(45) Date of Patent: Mar. 23, 2021

(54) SERVER-ASSISTED ROUTING IN NETWORK COMMUNICATIONS

(71) Applicant: Itron, Inc., Liberty Lake, WA (US)

(72) Inventor: Bernard M. Woodland, Cary, NC (US)

(73) Assignee: ITRON, INC., Liberty Lake, WA (US)

( * ) Notice: Subject to any disclaimer, the term of this patent is extended or adjusted under 35 U.S.C. 154(b) by 67 days.

(21) Appl. No.: 16/229,192

(22) Filed: Dec. 21, 2018

(65) Prior Publication Data
US 2020/0204487 A1    Jun. 25, 2020

(51) Int. Cl.
| | | |
|---|---|---|
| *G06F 15/173* | (2006.01) | |
| *H04L 12/717* | (2013.01) | |
| *H04L 12/707* | (2013.01) | |
| *H04L 12/753* | (2013.01) | |

(52) U.S. Cl.
CPC .............. *H04L 45/42* (2013.01); *H04L 45/24* (2013.01); *H04L 45/48* (2013.01)

(58) Field of Classification Search
USPC .................................. 709/224, 223, 238, 217
See application file for complete search history.

(56) References Cited

U.S. PATENT DOCUMENTS

| | | | | |
|---|---|---|---|---|
| 7,545,755 B2* | 6/2009 | Fan ................... | H04L 29/12009 |
| | | | 370/254 |
| 8,612,576 B1* | 12/2013 | Brandwine ............. | H04L 43/08 |
| | | | 709/224 |
| 9,036,504 B1* | 5/2015 | Miller ................... | H04L 45/586 |
| | | | 370/254 |
| 2007/0206503 A1 | 9/2007 | Gong et al. | |
| 2010/0195515 A1* | 8/2010 | Lin ......................... | H04L 69/28 |
| | | | 370/252 |
| 2015/0023174 A1 | 1/2015 | Dasgupta et al. | |
| 2016/0050152 A1* | 2/2016 | Sung ....................... | H04L 45/22 |
| | | | 370/235 |

OTHER PUBLICATIONS

Goyal, M. et al., "Reactive Discovery of Point-to-Point Routes in Low Power and Lossy Networks," IETF Internet Draft, RFC6997, ISSN: 2070-1721, Aug. 2013, pp. 1-40.
PCT International Search Report and Written Opinion dated Mar. 17, 2020, for PCT Application No. PCT/US19/66565, 9 pages.

* cited by examiner

*Primary Examiner* — Lan Dai T Truong

(57) ABSTRACT

A network node device and method of determining a communication route to one or more other network nodes through a network. The method includes sending current routing information to a network management server (NMS), and receiving new or supplemental routing information from the NMS, this supplemental routing information determined by the NMS based on the current routing information of the network node and of the one or more other network nodes. The supplemental routing information may include lateral route information identifying designated routing nodes that form lateral band(s) of nodes that span the network, each lateral band including gate node(s) as entrances/exits to the lateral band. The method may further include determining, based on the supplemental routing information, a route to one or more of the other network nodes. A lateral band may facilitate a route through a chokepoint or other abnormal topological layout.

23 Claims, 21 Drawing Sheets

SERVER-ASSISTED ROUTING IN NETWORK COMMUNICATIONS

FIELD OF THE DISCLOSURE

This disclosure relates generally to communications among networked communication devices, and more particularly to routing of such communications.

BACKGROUND

Routing is an important aspect of network communications, and the specific routing technique(s) used may differ depending on the type of network(s) involved. For example, mesh networks differ from internet protocol or IP-based networks (e.g., IPv4/IPv6-based local area networks (LANs) or wide area networks (WANs)). While their differences may present various limitations and constraints, these differences may also provide benefits of each type of network over the other. For example, one would not typically see the IP suite of routing protocols (e.g., RIP (routing information protocol), OSPF (open shortest path first), IGRP (interior gateway routing protocol), EIGRP (enhanced interior gateway routing protocol), IS-IS (intermediate system to intermediate system), BGP (border gateway protocol, etc.)) applied to mesh networks and mesh routing protocols (e.g., RPL (routing protocol for low-power and lossy networks)) applied to IP-based (e.g., LAN/WAN) networks, even though all of the IP protocols are self-forming, where nodes rely on routing information from other nodes (e.g., neighboring nodes or other nodes) in the network. One reason why IP-based routing protocols may not be ideal in a mesh network is that neighboring nodes in a mesh network may not be as reliably connected (e.g., with cables or high-powered persistent wireless (e.g., radio) paths, such that the topology may be constantly changing. One reason why a mesh-based routing protocol (e.g., RPL) may not be ideal in an IP-based network is because RPL uses "vertical" (up/down) paths, as discussed in more detail below.

One significant difference between a mesh network and an IP-based (e.g., LAN/WAN) network is that a mesh network consists of a cluster of nodes with a single head node, or root node. This head node is the ultimate access point for all of the nodes of the mesh network, and the mesh network nodes can access other mesh network nodes, or even devices beyond the head node, via the head node. Due to this characteristic of mesh networks, communications in a mesh network traverse in an up/down manner only, where a communication from one node to another node may need to traverse up the network, through the head node, and down the network to reach another node (even a node that may be in closer proximity than the head node). In many mesh networks, this routing through a single head node may take more time and may also create congested network traffic, which may worsen the closer the communication comes to the head node.

A network congestion scenario is demonstrated in network 100 of FIG. 1, where one or more network nodes 102 may send communications to root node 104 via a vertical communication path 106. More congested traffic 108 can be seen closer to root node 104. Many communications today need to go from one node to another (as opposed to to/from a root node or even beyond the root node (if applicable)), and may only be able to do this via the root node using typical vertical communication routing protocols, such as RPL. This seems inefficient and an unnecessary usage of many network nodes that have no need themselves for the communication and are already heavily burdened with other communications.

As stated earlier, RPL is a self-forming route protocol, where each network node may learn its routes from its adjacent neighbors, which in turn learn their routes from their adjacent neighbors, and so on, in an ad-hoc fashion. This concept is described in RFC 6997 (M. Goyal et al., "Reactive Discovery of Point-to-Point Routes in Low Power and Lossy Networks," IETF Internet Draft, August 2013). An example of this can be seen in FIG. 2, where network nodes 202 are querying their adjacent neighbors. While self-forming route protocols have advantages such as self-organization, flexibility, lack of reliance on another entity, and self-healing capability (e.g., route repairing when a network node goes down), these protocols tend to be less scalable. For at least these reasons, a solution that can benefit from the advantages of self-forming routing while minimizing the disadvantages is desired.

Figure 1:
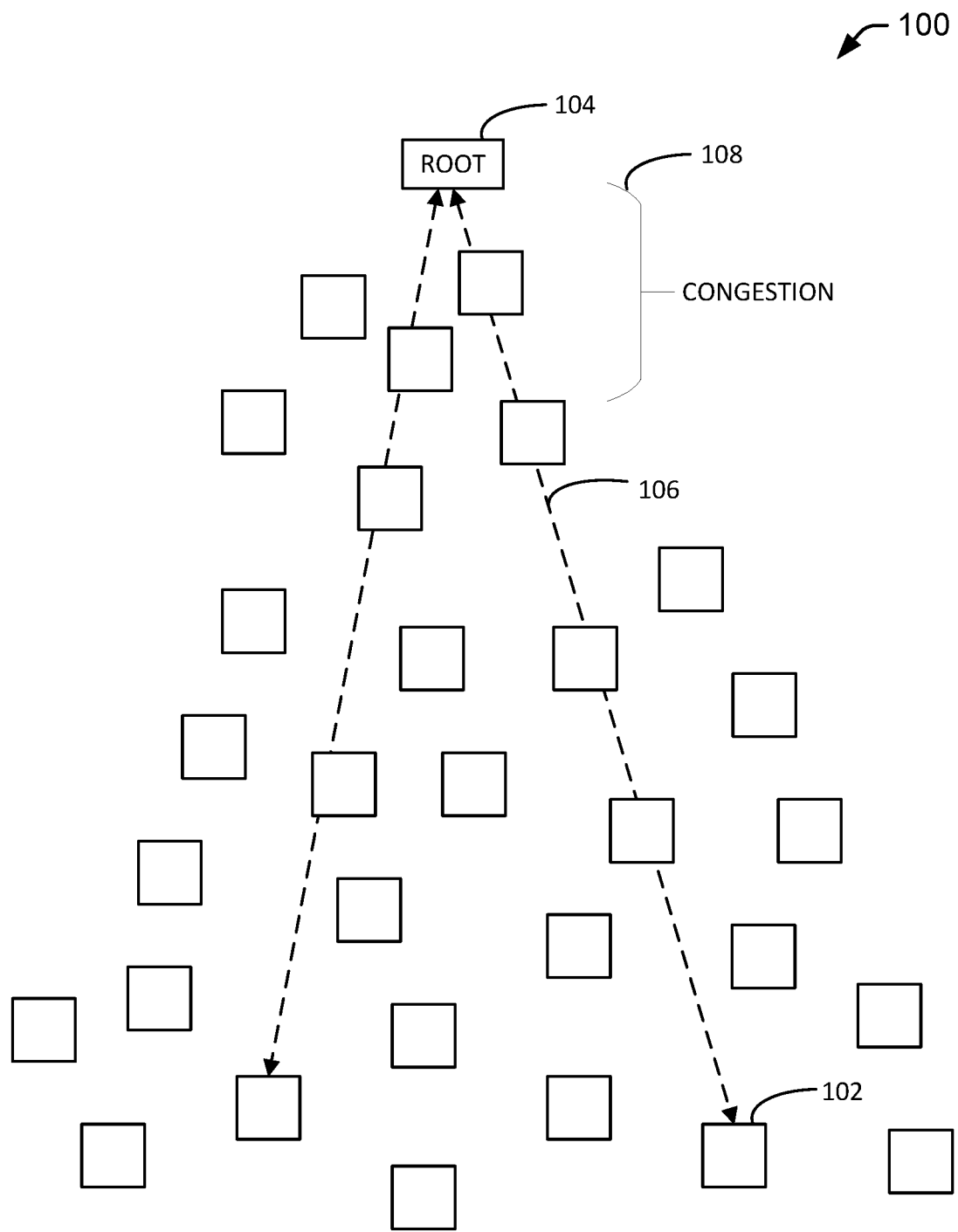
FIG. 1 is a high-level diagram depicting an example communication environment including a network of node devices engaging in vertical communications to/from a root node.
Figure 2:
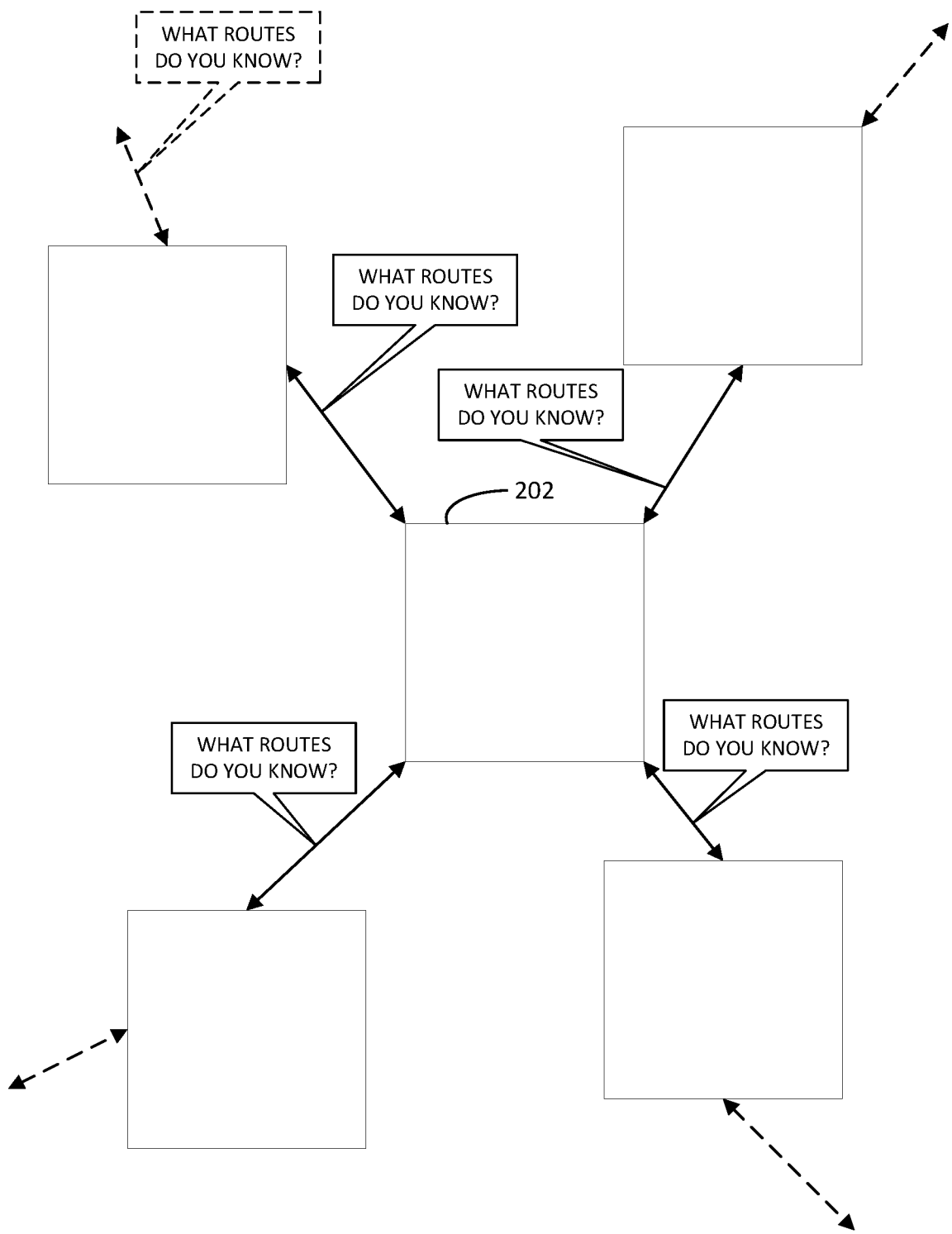
FIG. 2 is a block diagram illustrating an example of typical self-forming routing within a network.

In the drawings, the leftmost digit(s) of a reference number may identify the drawing in which the reference number first appears.

DETAILED DESCRIPTION

The description herein discloses techniques and solutions that may be used to provide efficient routing in a communication network while minimizing network congestion of typical ad-hoc (e.g., self-forming) routing methods.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that the technology disclosed herein can also be employed in a variety of other systems and implementations other than what is described herein.

As stated in the Background section above, there is a need to provide efficient node-to-node communications in a network, especially when the nodes are not in the same upstream/downstream path from a root node. Examples of applications that would benefit from this capability include distributed intelligence, where nodes may need to expediently share information with each other, firmware or software downloads where nodes can share in the distribution and also respond to requests for missing or corrupted packets without forcing a node to obtain everything from a head-end system or node, etc. In addition, it would be ideal for node-to-node routes to avoid, or at least not contribute to causing, network congestion, and to also avoid chokepoints that may exist in a network. Techniques that provide these capabilities will now be described.

As discussed in the Background, one significant difference between a mesh network and an IP-based (e.g., LAN/WAN) network is that a mesh network consists of a cluster of nodes with a single head node. This head node may act as an exit point of the mesh network that is known by all of the mesh network nodes. That exit point may potentially link the nodes to other devices or other networks outside of the mesh network. In other words, since the mesh network of nodes can connect to one head node, the mesh network nodes can also connect to any device, etc., to which the head node has access. Therefore, all of the nodes in the mesh network can have access to a server outside of the network, including a network management server, discussed below.

Many networks include a network management system for monitoring, optimizing, and maintaining a network. A network management system may include a network management server or distributed group of servers used to manage a network. The network management system may provide network device monitoring/management, new network device detection/configuration, performance analysis, fault management, etc. In short, a network management system oversees a network of network devices or nodes. The network management server (NMS) of a network management system may collect connectivity-related and/or other information from network nodes, and may do so using any known method (e.g., RPL). An example of this is shown in network 300 of FIG. 3A. Network 3A is a high-level diagram depicting an example communication environment including a network of endpoint or node devices 302 (including a root node 304) and an NMS 306. Network 300 is shown as a mesh network; however, network 300 may also be a star network, or any kind of network, wired or wireless.

Figure 3A:
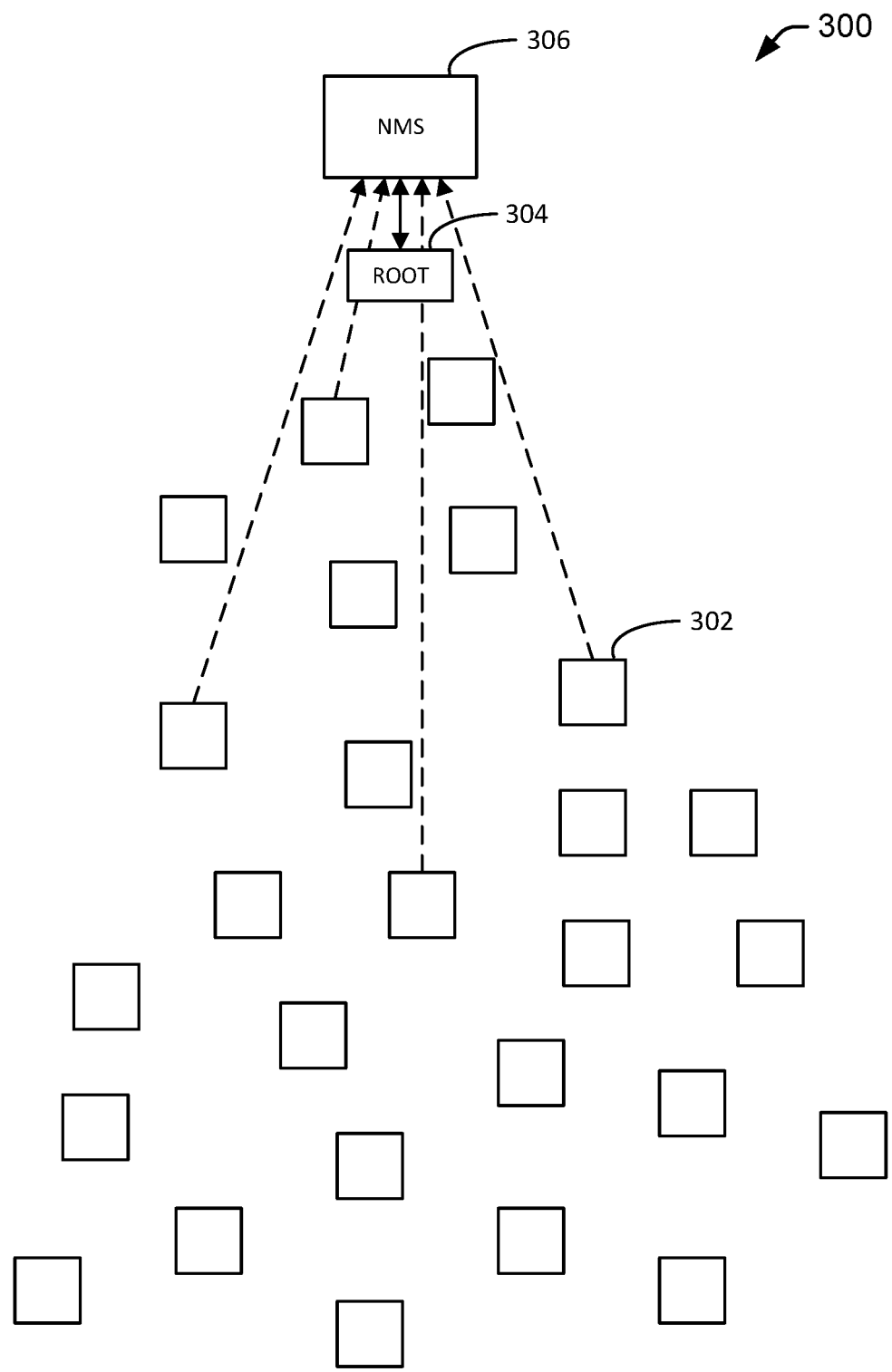
FIGS. 3A and 3B are block diagrams depicting an example of server-assisted routing, according to embodiments of the present disclosure.

In the example of FIG. 3A, NMS 306 may collect information from each of nodes 302. The information may be collected from direct communications between NMS 306 and a node, via other network nodes, and/or via a root node 304. The information collected from each node (and/or determined using information collected from each node) may include identification of neighbor nodes, signal strengths to each neighbor node, packet counts to/from neighbor nodes, percentage of time that a given neighbor is reachable, number of hops from a root node, parent node information, child node information, age of current parent node, age of previous parent node, secondary parent node information, number of parent changes within a predetermined time period, bandwidth consumption with a predetermined time period, statistical fluctuations of neighbor signal strengths, mean, and standard deviations, quantum changes of neighbor signal strengths (e.g., with times), geographic location of the node (e.g., longitude/latitude), etc.

NMS 306 may analyze the collected information and use it to build a topology model of the network. In this way, NMS 306 may have a "bird's eye view" of the network and may be able to determine routes that a self-forming route algorithm cannot determine based on neighbor information alone. NMS 306 may also analyze the collected information for chokepoints and other areas of congestion in network 300. For example, in an embodiment, using global positioning (GPS) coordinates (e.g., latitude/longitude), distances between meters may be calculated, and a theoretical best-case signal strength may be determined. Using this information, a degraded non-congested strength may be determined. (Congestion traffic will degrade signal strength, thus obtaining actual best-case strength may be difficult.) A congestion "factor" (e.g., congestion at a node) may also be determined based on actual signal strengths, determined best-case signal strengths, packet counts, and/or distances, etc. In addition, NMS 306 may also conduct multi-network connectivity analyses. Using the collected, analyzed, and determined information, NMS 306 may determine vertical (e.g., up/down or north/south) packet lanes and congested areas, and may devise an overall model of the network and its potential traffic. An analysis of the model against actual measurements and statistics may be conducted to determine the level of accuracy (e.g., within tolerances) in the model. Additional or updated information may be collected from nodes 302 to ensure that any changes are known by NMS 306 such that the network model may be updated. These updates may be provided via a predetermined schedule or by request of NMS 306. To save bandwidth, the updates may accompany other information that nodes 302 may provide to NMS 306 (e.g., sensor readings, data reports, etc.).

Figure 3B:
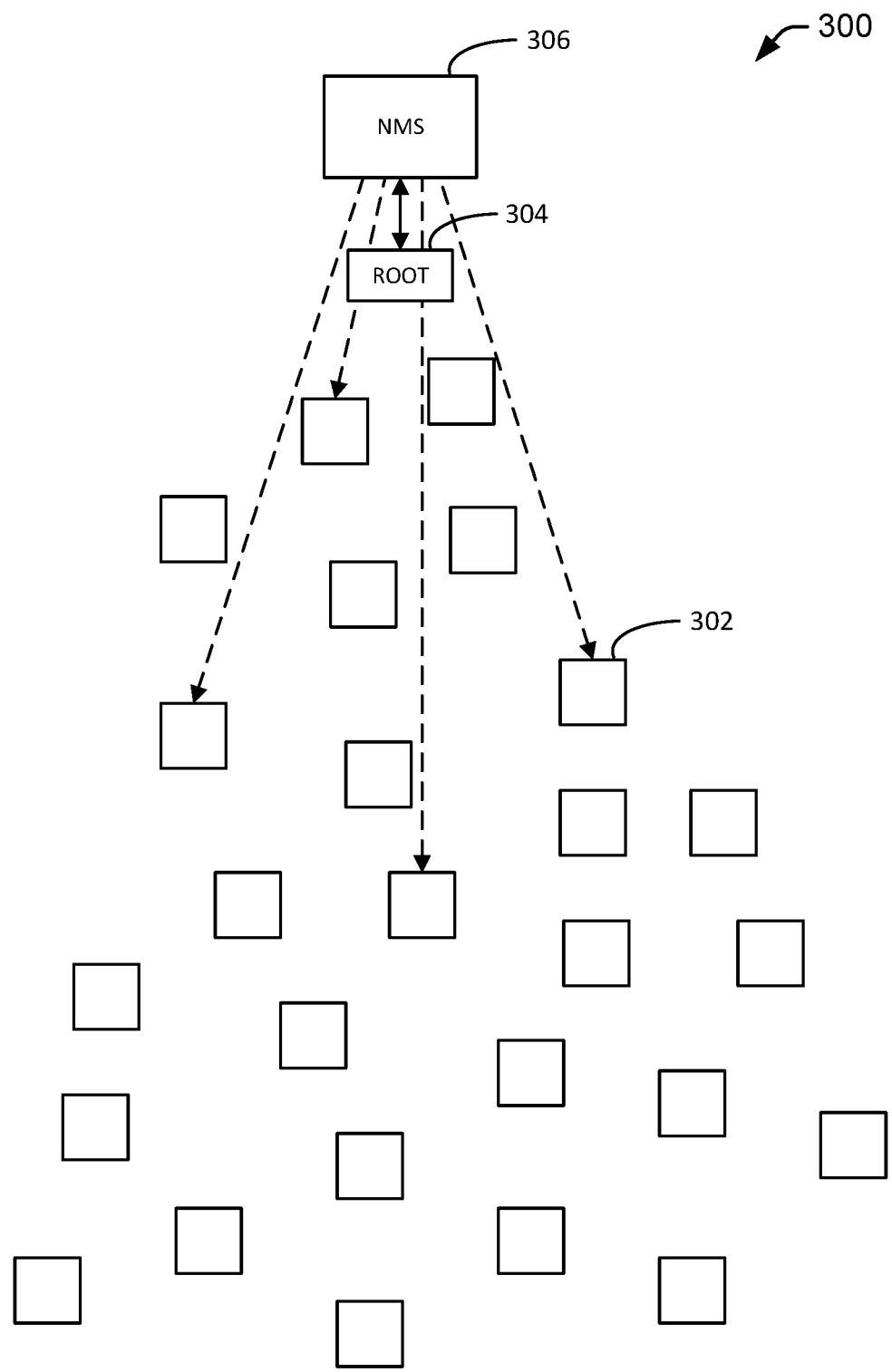

NMS 306 may also determine, based on the collected node information and analysis, routes, partial routes, alternative routes, and/or other route information and may provide that information to nodes 302, as shown in FIG. 3B. The information may be provided to nodes 302 via unicast or multicast. In an embodiment, the information may be provided with other data and/or information provided to nodes 302 by NMS 306 (e.g., to save bandwidth). When partial routes are provided, it may be because full routes are not necessary or because a node may be capable of completing the route on its own in a known fashion. In an embodiment, NMS 306 may specify a list of next-hop neighbors to a destination node, and the network nodes may select from among the nodes in the list the best route, which may be updated in near-real-time based on the connectivity dynamics within the network. In another embodiment, the determined routes and/or route information may include information defining one or more lateral bands of network nodes that may partially or fully span the network. Lateral bands may be determined based on the collected node information and analysis thereof, including consideration of physical proximity (e.g., number of hops from one node to another or to a root node), signal strengths, link or node reliability, historical data, etc. Routing through the lateral band(s) may also be determined and provided by NMS 306. For example, in an embodiment, the determined network model may be used to determine optimal location(s) for lateral bands. In addition, entry and exit nodes (and optimal paths to reach them), as well as areas in the lateral band(s) that may need to be bolstered with redundancy, may be determined. NMS 306 may run tests via the determined network model to analyze and test the lateral robustness of node-to-node communications through the determined lateral band(s). NMS 306 may also run tests via the determined network model, including the lateral band(s), to test packet exchange for large traffic items (e.g., point-to-point firmware download image transfers). Once lateral band(s) are determined, the determined routes and/or routing information, including the determined lateral band(s), may be provided to the nodes. An analysis of the theoretical performance of the lateral band(s) against actual measurements and statistics may be conducted to determine the level of accuracy (e.g., within tolerances) in the lateral band configuration(s). In an embodiment, if performance is outside of given tolerances, the configuration of the lateral band(s) may be adjusted. In an embodiment, test transmissions may be sent through the network to test the theoretical network model, including any lateral bands.

Figure 4:
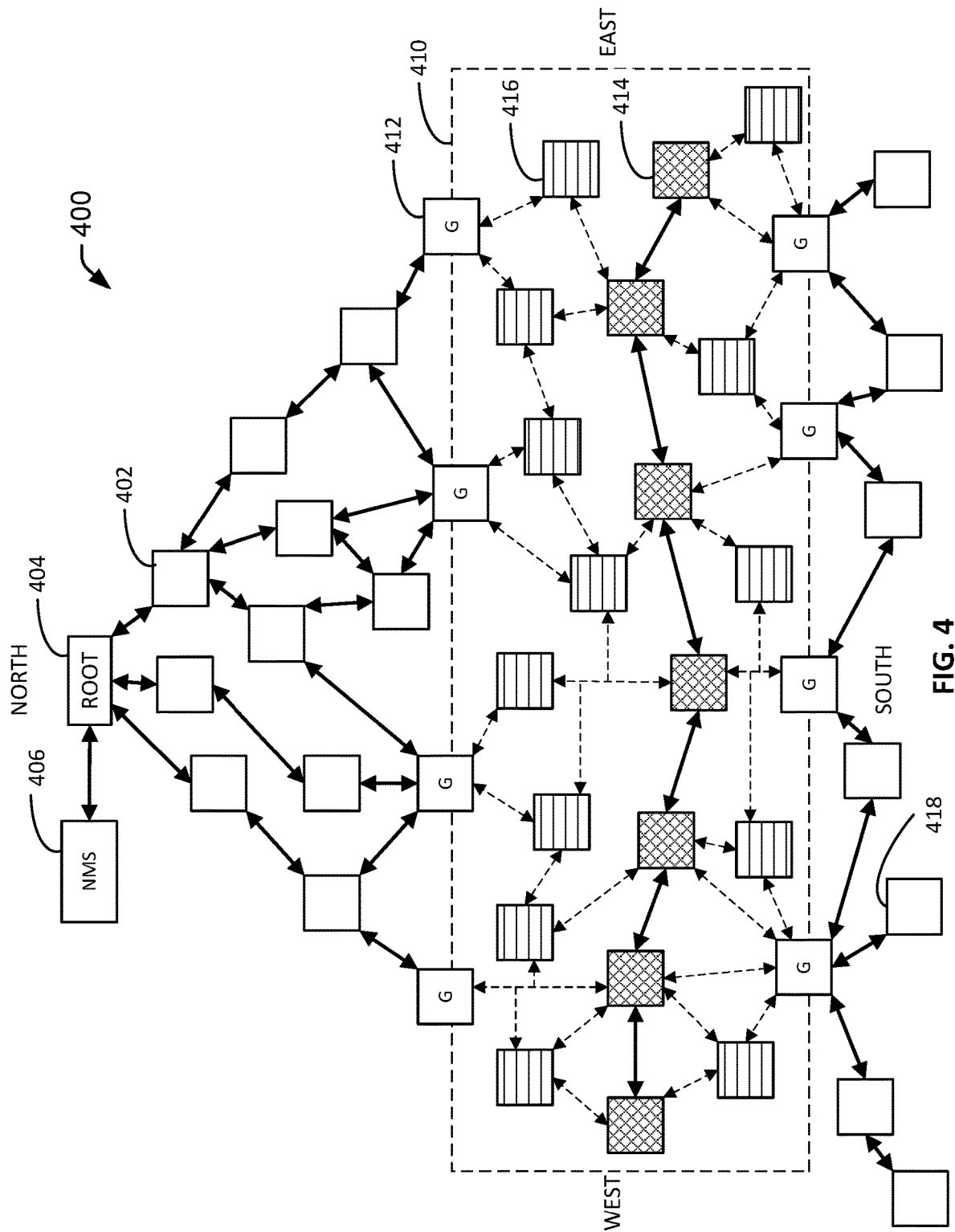
FIG. 4 is a block diagram illustrating an example of a lateral band in a communication network of nodes, according to an embodiment of the present disclosure.

FIG. 4 is a block diagram illustrating an example lateral band 410 in a communication network 400 of nodes 402, according to an embodiment of the present disclosure. While one lateral band is shown for the sake of example, any number of lateral bands may exist in a network. Lateral band 410 includes NMS-assigned designated route nodes such as gate nodes 412, primary lateral nodes 414, and secondary lateral nodes 416. Gate nodes 412 (denoted by the letter "G") are nodes at which a communication enters or exits lateral band 410. Primary lateral nodes 414 (denoted by the cross pattern) create a main lateral pathway (e.g., a preferred or ideal pathway) across lateral band 410, and secondary lateral nodes 416 (denoted by horizontal lines) act as stepping stones between gate nodes 412 and primary lateral nodes 414 and/or as alternate primary lateral nodes, if needed. In the example shown, primary lateral nodes 414 span the entire network 400. In other embodiments, primary lateral nodes 414 may not span an entire network, depending on implementation and/or necessity. The spacing of the nodes in a lateral band may be designed to be close enough that it would not be difficult for a node to find a route, but far enough to minimize scale values. In FIG. 4, the indications of North, South, East, and West are not used as actual compass directions but used for ease of understanding. Gate nodes to the "north" of lateral band 410 are children of non-band nodes "north" of lateral band 410, and gate nodes to the "south" of lateral band 410 are parent nodes of non-band nodes "south" of lateral band 410. In an embodiment, any network traffic that is to pass through lateral band 410 would be routed to a gate node 412 using a non-lateral routing method, would route through lateral band 410 via a designated lateral route, and would exit lateral band 410 through another gate node 412 using a non-lateral routing method. With a lateral band in place, a node that needs to send a communication to another node via a lateral band may route the communication just to the band (e.g., to the closest designated routing node), and from there the communication may then be routed through the band and on to its destination.

In an example, when a communication travels through network 400 from a node "north" of lateral band 410 (e.g., root node 404) to a destination node "south" of lateral band 410 (e.g., node 418), the communication may be routed via a non-lateral routing method (e.g., RPL) as well as a lateral routing method to reach its destination. More specifically, the communication may be routed in the direction of destination node 418 using a non-lateral routing method (e.g., RPL) to one of gate nodes 412 on the "north" side of lateral band 410 as an entrance to lateral band 410. From the northern gate node 412, the communication may be routed through lateral band 410 to another gate node 412 on the "south" side of lateral band 410 as an exit from lateral band 410. In an embodiment, the exit gate node would be a gate node that is in substantially close proximity to destination node 418. The routing through lateral band 410 may be a routing previously defined by NMS 406 for destination node 418. To travel from an entrance gate node to an exit gate node, the communication may be routed from the entrance gate node to one or more secondary lateral nodes 416 to a primary lateral node 414, and along a primary lateral node pathway (indicated by bolded arrows between primary lateral nodes 414), and through one or more additional secondary lateral nodes 416 (if necessary) to an appropriate exit gate node. From the exit gate node, the communication may be routed to destination node 418 using a non-lateral routing method (e.g., RPL). In short, a communication may be routed vertically (in a north/south direction) using a non-lateral routing method (e.g., RPL) and horizontally (in an east/west direction) using a designated lateral route across a pre-defined lateral band.

Figure 5:
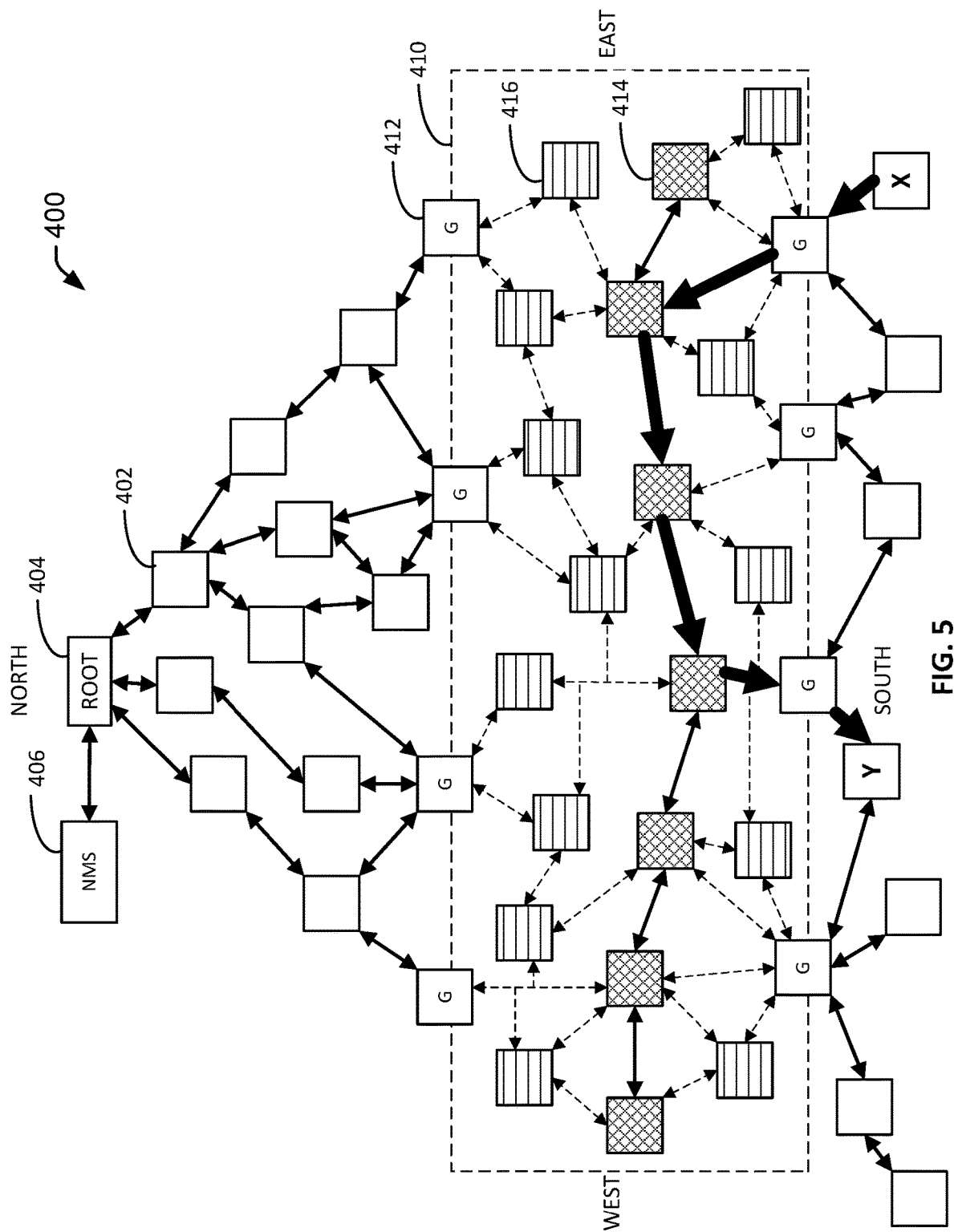
FIG. 5 is a block diagram depicting a route through a lateral band determined by server-assisted routing, according to an embodiment of the present disclosure.

FIG. 5 shows another example of a communication being routed through lateral band 410 in network 400, according to an embodiment of the present disclosure. In this example, a communication is being routed from a node "south" of lateral band 410 (designated by X) to another node "south" of lateral band 410 (designated by Y). To travel this route, the communication uses a non-lateral routing method to head in the direction of root node 404. When the communication reaches a gate node 412, the communication ceases to use the non-lateral routing method and instead uses an NMS-designated lateral route in a "westerly" direction to another gate node 412 in substantially close proximity to destination node Y. The communication then uses the non-lateral routing method to reach destination node Y.

In the example shown in FIG. 5, for efficient routing through lateral band 410, an appropriate gate node 412 nearby to destination node Y may be known prior to sending the communication. In an embodiment, this information may be explicitly provided to the network nodes 402 by NMS 406. In another embodiment, sending node X may determine this information ahead of time. One way of doing so is by multicasting test packets. For example, destination node Y may multicast an initial packet throughout the network announcing what lateral band (e.g., lateral band 410) and what gate node on the lateral band should be used to reach it. A sending node (e.g., sending node X), having learned what lateral band and exit gate node to use, may send a test packet to destination node Y, the test packet identifying the appropriate exit gate node for reaching node Y. When the test packet enters lateral band 410, the gate node at which it entered may be appended to the test packet. The test packet is then routed through lateral band 410, exits the appropriate gate node, and is routed to destination node Y as described above. Destination node Y obtains the exit gate node for sending node X that was appended to the test packet. In this way, both sending node X and destination node Y have each other's exit gate nodes on lateral band 410 that they need in order to reach each other.

Figure 6:
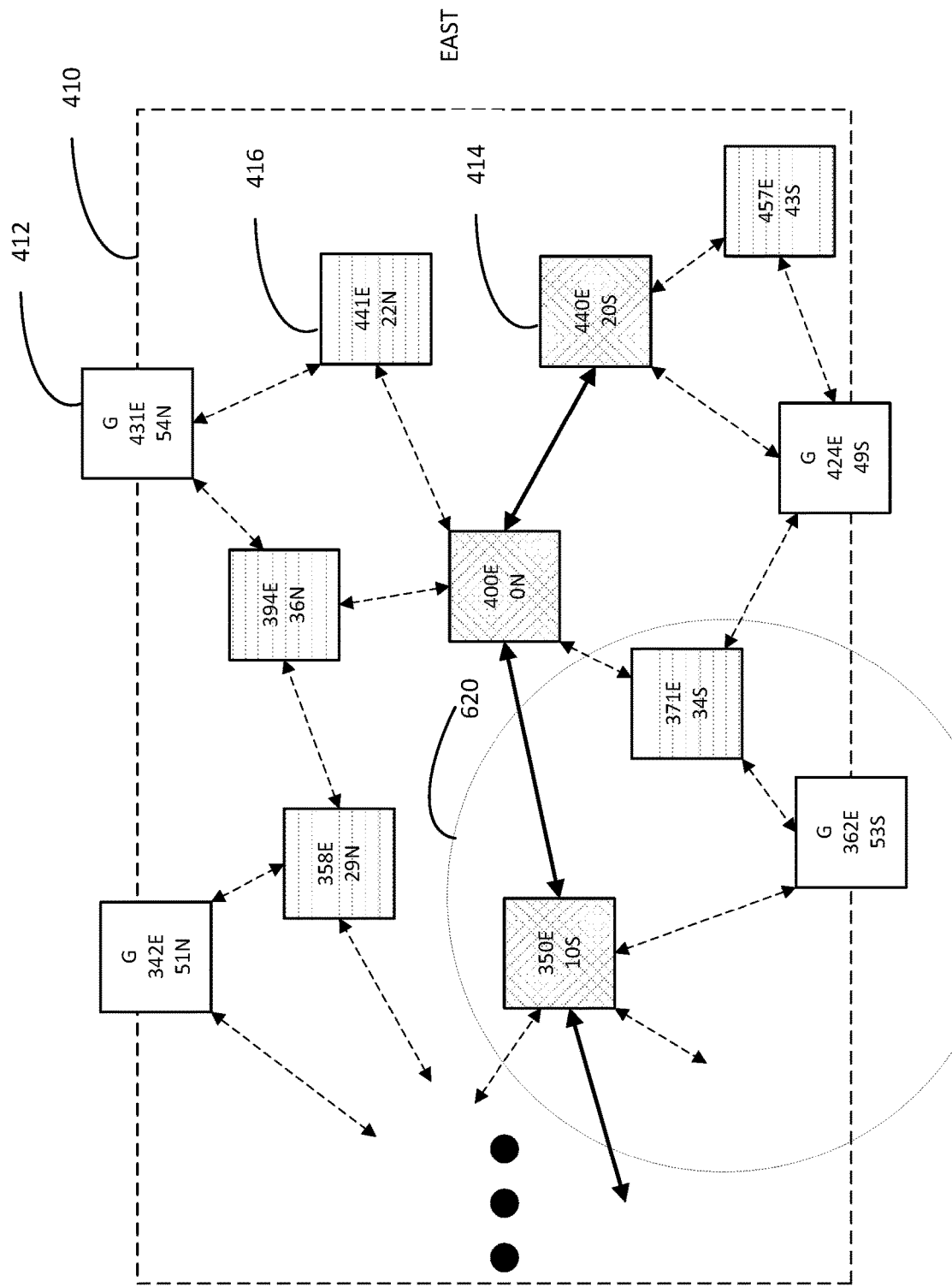
FIG. 6 is a block diagram illustrating location designations for nodes of a lateral band, and also an example drain from the lateral band, according to an embodiment of the present disclosure.

FIG. 6 shows a portion of lateral band 410 enlarged for ease of viewing, with designated routing nodes within the band labeled with identification/location values assigned by NMS 406. In an embodiment, each node may be assigned two numbers, with each number followed by an E, W, N, or S (for East, West, North, or South). These values indicate where in lateral band 410 each node is located. In an embodiment, the E values will have an origin at the very left (or "west") side of lateral band 410, and therefore increase from the very left to the right (in this case, no "W" indications would be needed). A north/south origin may also be arbitrarily designated, with a zero ("0") value being located near the center of lateral band 410, with nodes labeled as "N" increasing from that level northward, and with nodes labeled as "S" increasing from that level southward. In another embodiments, other value mappings may be used (e.g., having an origin of (0,0) at one corner of lateral band 410, and using only two directional indications (e.g., N and E, S and E, etc.). In an embodiment, primary lateral nodes may be numbered by tens (on at least one axis), with other nodes filling in the gap values between the 'tens' values. However the value numbering, NMS 406 and/or the network nodes may use these values in determining routes to other network nodes. For example, if a node in lateral band 410 needs to route a communication far to the east, it may check all of its neighbor's "E" values and send the communication to the neighbor with the greatest "E" value. In an embodiment, a communication may be sent along the primary lateral node path in the easterly direction, where primary lateral nodes may direct a packet to a secondary lateral node (in a north/south direction), when needed (e.g., if a primary lateral node is down or to access an exit gate node). In an embodiment, an N/S value may also help to find gate nodes, since the gate nodes are the "northern"-most and "southern"-most nodes of a lateral band. Gate nodes may advertise their exit node status to their adjacent neighboring nodes (and optionally to other nodes as well). For example, the gate node at (362E, 53S) may inform its neighboring nodes at (350E, 10S) and (371E, 34S) that it is a gate node. This may form an exit point "drain" 620 within lateral band 410. In an embodiment, if a communication traversing lateral band 410 needs to find an exit, it may find it by routing in the appropriate direction (e.g., using its knowledge of the node locations within lateral band 410), and the communication may then find one of the "drain" points (e.g., an adjacent neighbor of a gate node), which may forward the packet to that gate node in order for the communication to exit lateral band 410. In an embodiment, the nodes in a lateral band may have knowledge of neighbor nodes of its neighbor nodes, and so on, in the lateral band, to a predetermined depth of levels. If a node in the lateral band has knowledge of a desired exit gate node, that node may be considered part of the "drain" and may direct a communication to the desired exit gate node.

Figure 7:
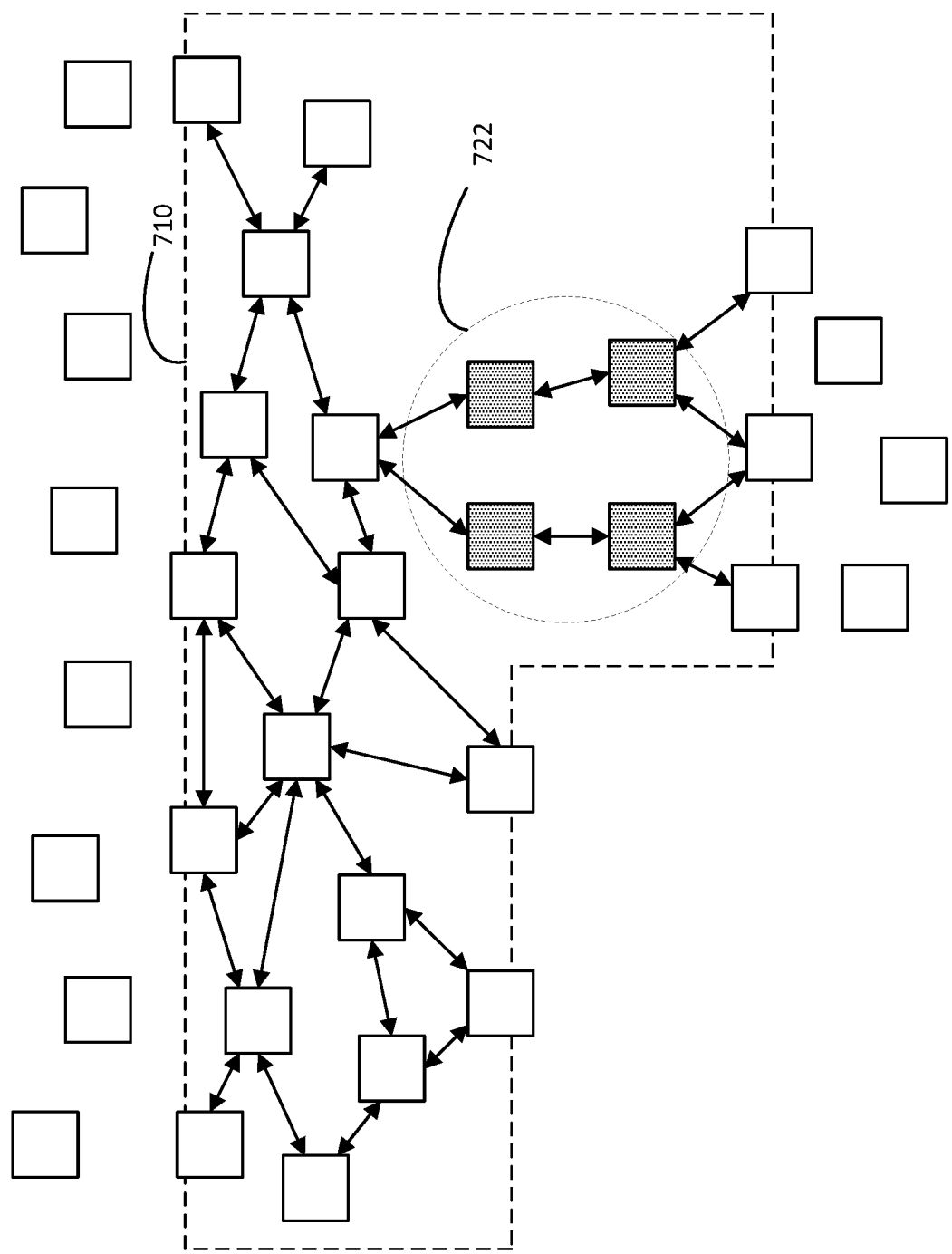
FIG. 7 is a block diagram depicting a server-assisted route through a chokepoint in a network, according to an embodiment of the present disclosure.
Figure 8:
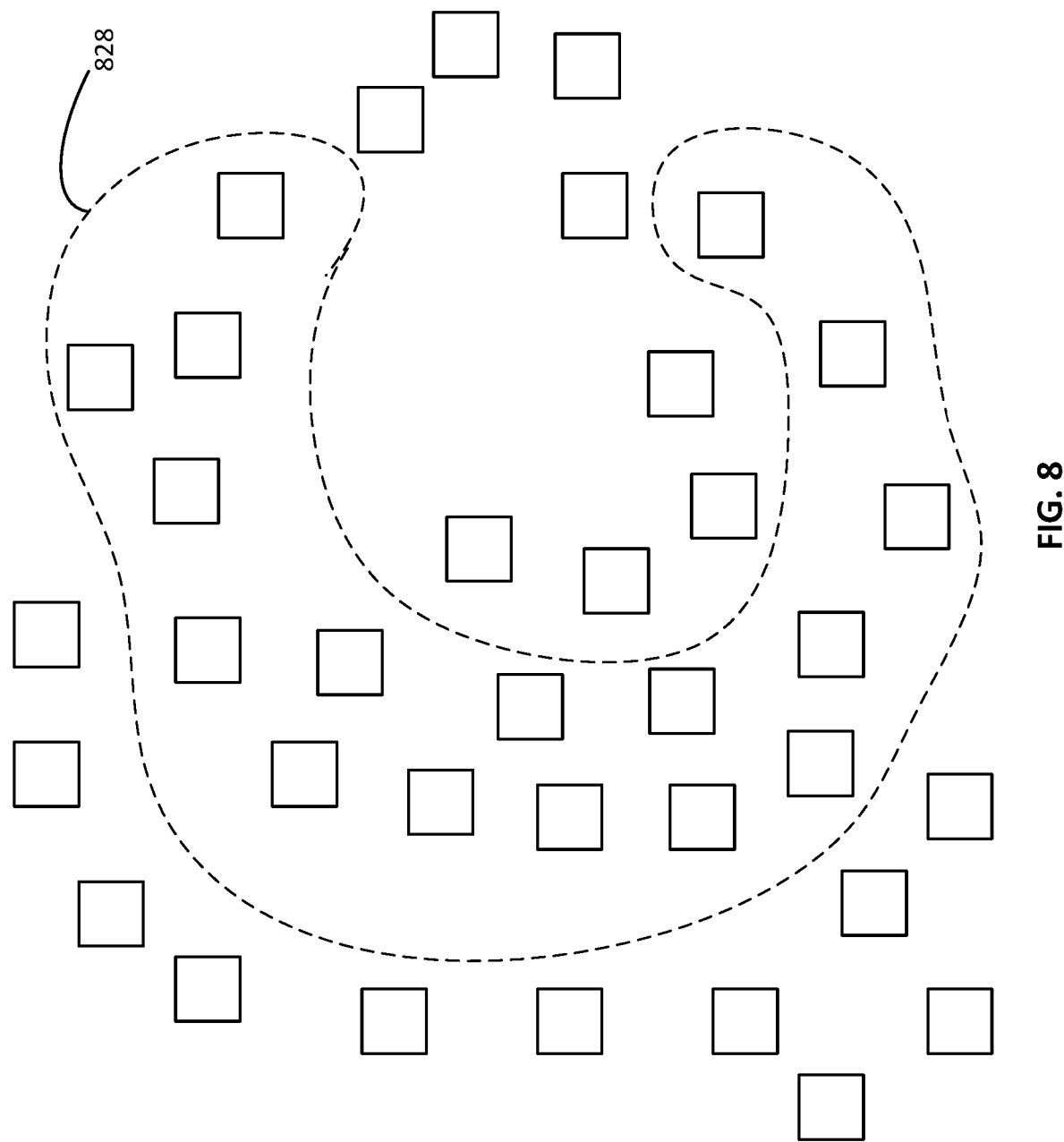
FIG. 8 is a block diagram showing an example lateral band in an odd-shaped network, according to an embodiment of the present disclosure.

Networks may have chokepoints that force communications through a small number of network nodes, which may cause network congestion. Chokepoints can be caused due to the topology or layout (e.g., locations) of the network nodes or other factors. An NMS may find chokepoints based on collected network information and historical information and consider those chokepoints when defining lateral band(s). In an embodiment, an NMS may designate nodes in a lateral band at locations on the ends of a chokepoint to allow communications to pass in and out of the chokepoint. This is demonstrated in FIG. 7, where nodes 722 of lateral band 710 are designated to guide communications through a chokepoint. As can be seen in FIG. 7, lateral band 710 is shaped like an "L" rather than a band. Some networks may form irregular or ill-defined shapes that may have curves or other arbitrarily shaped characteristics. In an embodiment, an NMS may construct a band whose purpose it is to route network traffic around difficult network topologies. In the example network shown in FIG. 8, there are two general paths that may be taken by communications traveling vertically (north or south), either a path on the left or a path on the right. If the path on the left is determined by an NMS to be a better path to take, the NMS may designate a horseshoe shaped band 828 which may assist in routing network traffic along the left side of the network rather than along the right side. These are but a couple of examples showing that an NMS may help determine routes that direct communications through chokepoints or other abnormal network topology layouts.

In an embodiment, an algorithm used by an NMS to determine routes and/or routing information may determine that human assistance is required (e.g., in determining an optimal route). In this scenario, an administrator of the network may be provided with a user interface with information regarding the routing issue and/or a request for input from an administrator. In an embodiment, a user interface may include a map (e.g., a virtual mapping of nodes or an actual map that includes the nodes at their actual geographical locations). The map may overlay network traffic patterns, congestion points, etc. The overlay may be done using color coding to indicate various types of information to a user (e.g., alternate path options, congestion points, lateral bands, node type indications inside lateral bands, etc.). In an embodiment, the user interface may present a problem graphically to an administrator so that the administrator may more easily understand the problem and determine a solution (e.g., adjustments to lateral bands, selection of a path from alternative choices, etc.).

FIGS. 9-17 are flow diagrams depicting concepts described above from various perspectives.

Figure 9:
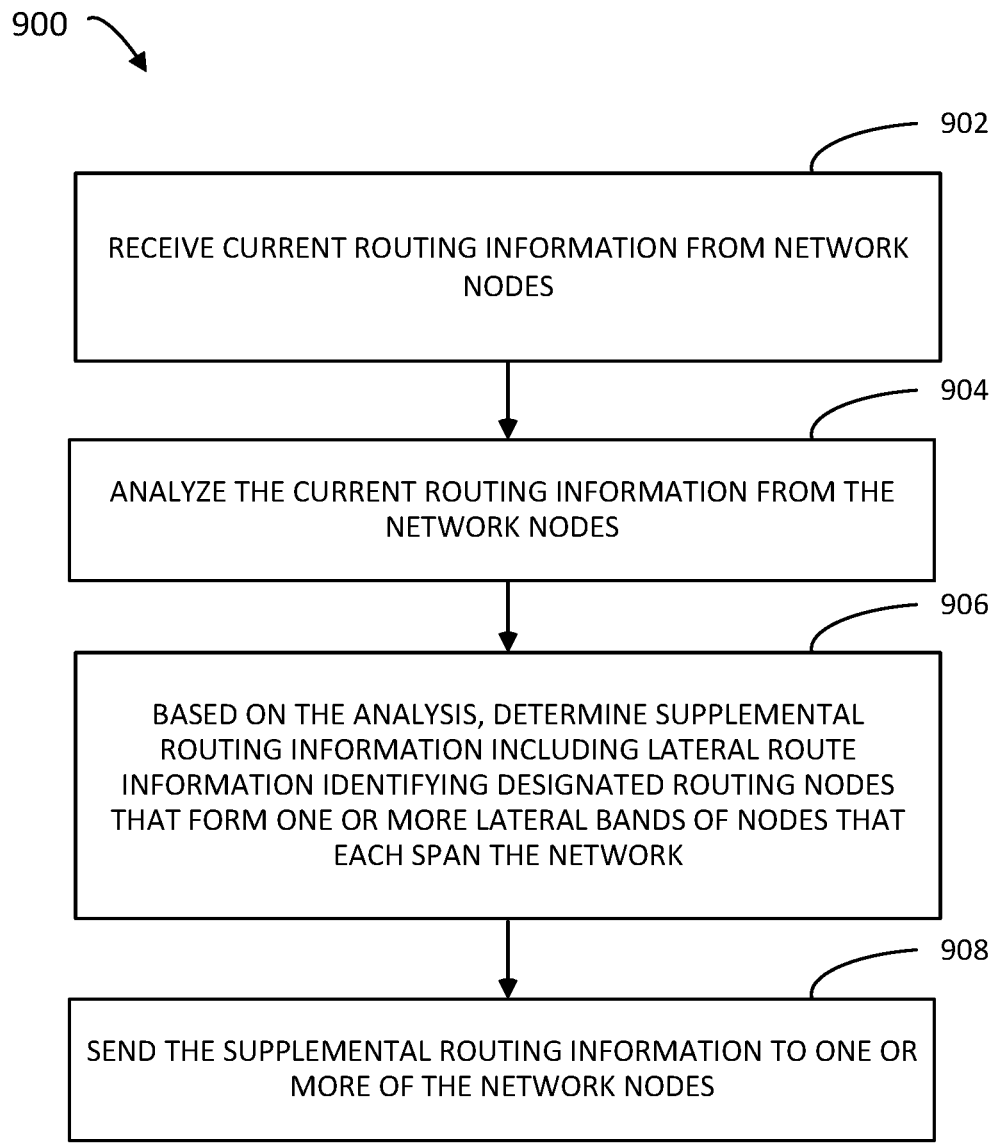
FIG. 9 is a flow diagram depicting an example method of providing server-assisted routing, from the perspective of a network management server, according to an embodiment of the present disclosure.

FIG. 9 is a flow diagram 900 depicting an example method of providing server-assisted routing, from the perspective of an NMS, according to an embodiment of the present disclosure. At 902, current routing information may be received by the NMS from network nodes. At 904, the current routing information from the network nodes may be analyzed. The analysis may also take into account statistics and historical data regarding the network. At 906, based on the analysis, new or supplemental routing information may be determined. This supplemental routing information may include lateral route information identifying designated routing nodes that form one or more lateral bands of nodes that each span the network. At 908, the supplemental routing information may be provided to one or more of the network nodes.

Figure 10:
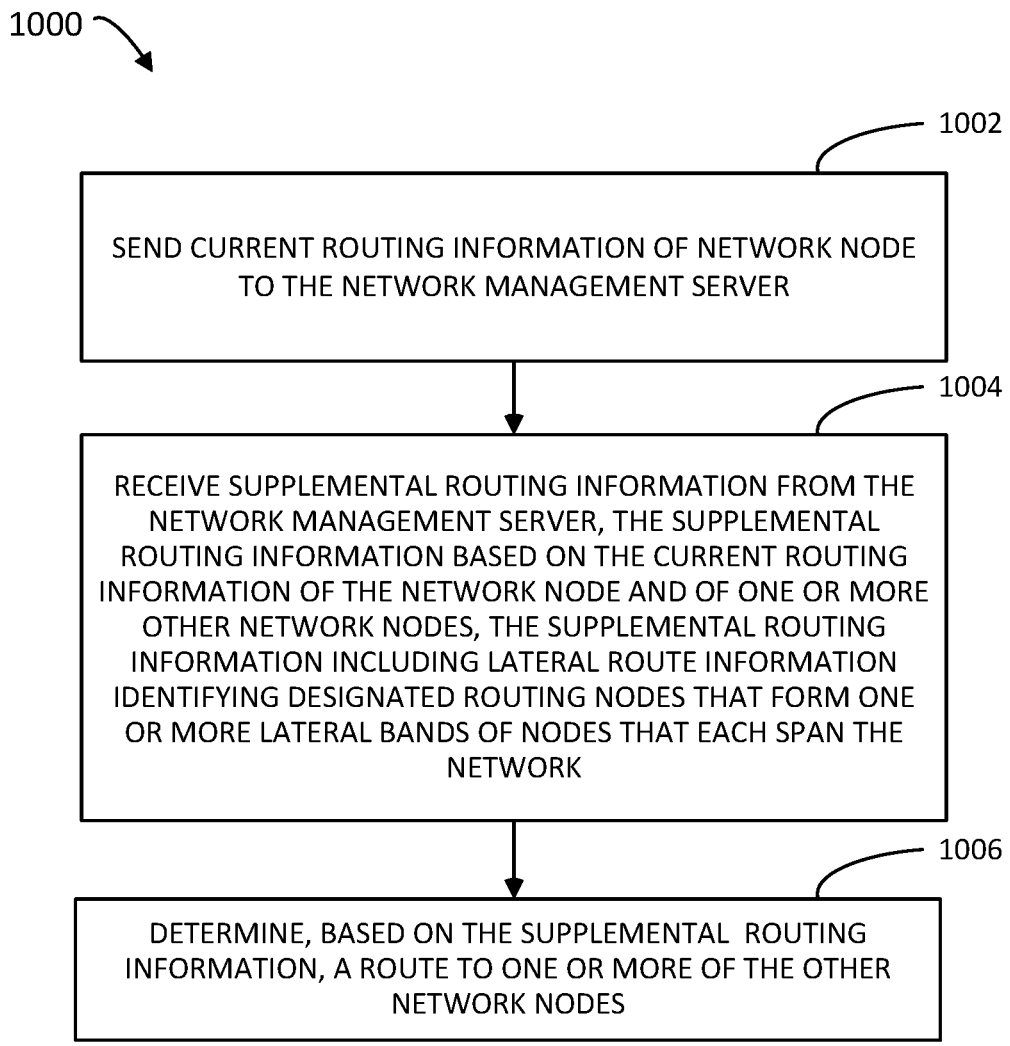
FIG. 10 is a flow diagram illustrating an example of providing server-assisted routing, from the perspective of a network node, according to an embodiment of the present disclosure.

FIG. 10 is a flow diagram illustrating an example method 1000 of providing server-assisted routing, from the perspective of a network node, according to an embodiment of the present disclosure. At 1002, current routing information of the network node may be sent to the NMS. At 1004, supplemental routing information is received from the NMS. The supplemental routing information may be based on the analysis of the NMS of the current routing information of the network node and current routing information of one or more other network nodes. The supplemental routing information may include lateral route information identifying designated routing nodes that form one or more lateral bands of nodes that each span the network. At 1006, the supplemental routing information may be used to determine a route to one or more of the other network nodes. In an embodiment, the supplemental routing information provides to the network node already determined routes to one or more of the other network nodes.

Figure 11:
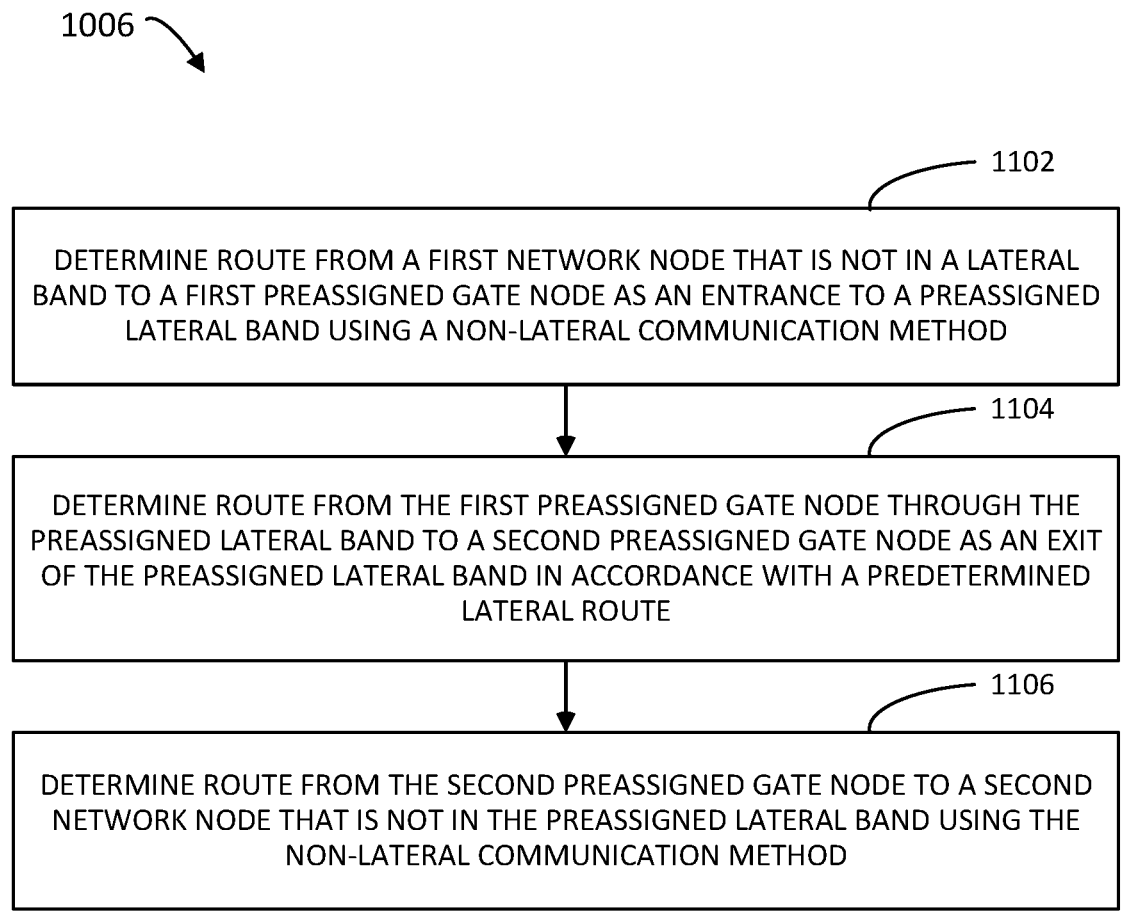
FIG. 11 is a flow diagram illustrating an example of what a server-assisted route may entail, according to an embodiment of the present disclosure.

FIG. 11 is a flow diagram illustrating an example of what a server-assisted route determination (of 1006) may entail, according to an embodiment of the present disclosure. In this example, a route is determined from a network node on one side of a lateral band to a network node on the other side of the lateral band. At 1102, a first route may be determined from a first network node (not in a lateral band) to a first preassigned gate node as an entrance to a preassigned lateral band using a non-lateral routing method (e.g., RPL). At 1104, a second route may be determined from the first preassigned gate node through the preassigned lateral band to a second preassigned gate node as an exit of the preassigned lateral band in accordance with a lateral route predetermined by an NMS. At 1106, a third route may be determined from the second preassigned gate node to a second network node (not in the preassigned lateral band) using the non-lateral routing method (e.g., RPL).

Figure 12:
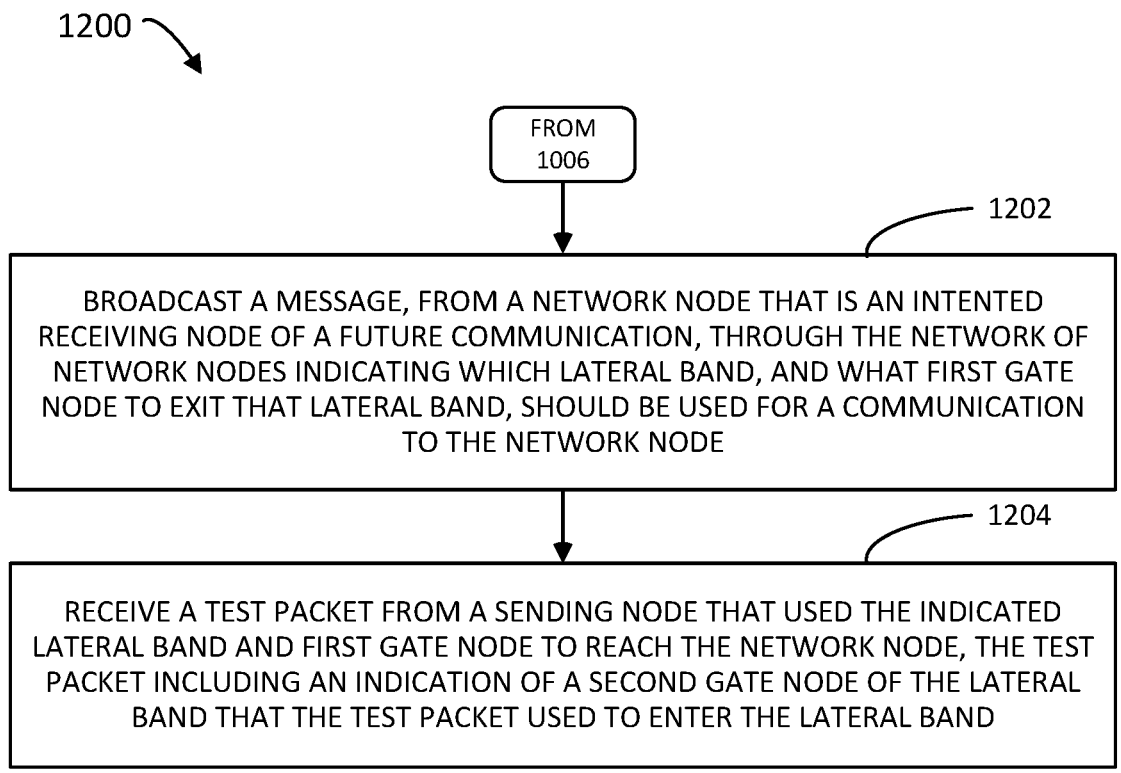
FIG. 12 is a flow diagram illustrating an exchange of lateral band and gate node information between two network nodes, according to an embodiment of the present disclosure.

FIG. 12 is a flow diagram 1200 illustrating an exchange of lateral band and gate node information between two network nodes, according to an embodiment of the present disclosure. This process may extend from 1006 of FIG. 10. At 1202, a message may be broadcast from a network node that is an intended receiving node of a future communication to other network nodes indicating which lateral band, and what first gate node to exit that lateral band, should be used for a communication to the network node. At 1204, a test message may be received from a sending node. The test message used the indicated lateral band and first gate node to reach the network node, and the test message included an indication of a second gate node of the lateral band that the test packet used to enter the lateral band when sent from the sending node. From this exchange, both the intended receiving node and the sending node are aware of the lateral band and exit nodes needed for any future communications between them.

FIGS. 13-17 are flow diagrams each illustrating the routing of a communication from the perspective of a particular network node, according to embodiments of the present disclosure. In these examples, the particular network node may be at a particular location along a route (e.g., a non-band node on a first side of a lateral band, a gate node along the first side of the lateral band, a primary or secondary lateral node of the lateral band, a gate node along a second side of the lateral band, or a non-band node on the second side of the lateral band).

Figure 13:
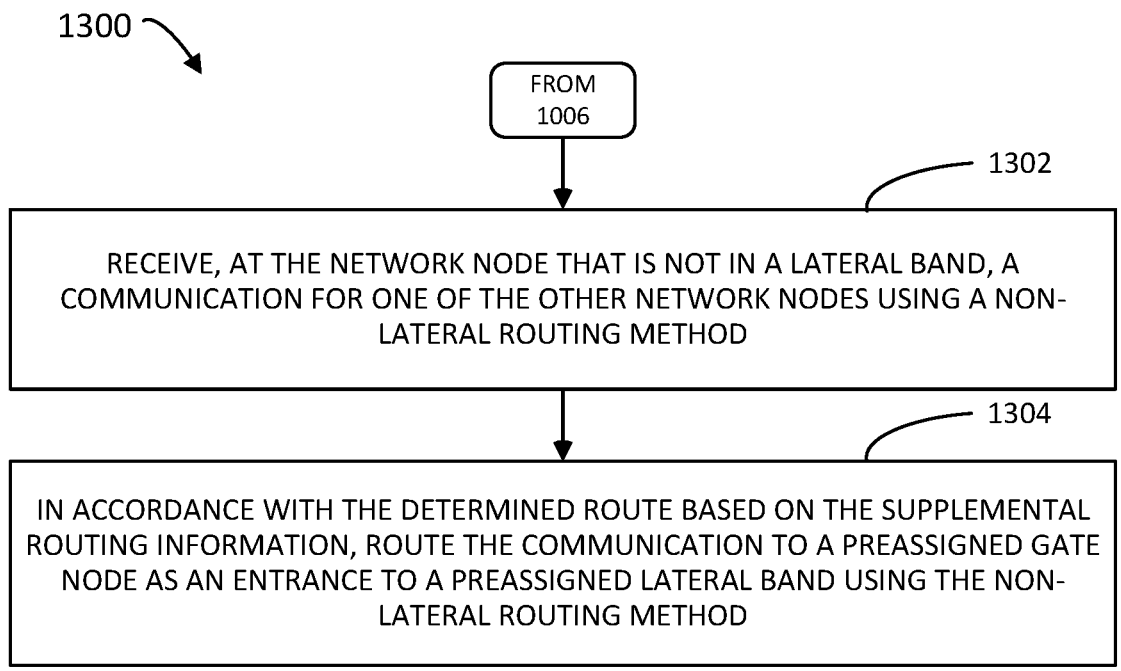
FIGS. 13-17 are flow diagrams each illustrating the routing of a communication from the perspective of a particular network node, according to embodiments of the present disclosure.

In example 1300 of FIG. 13, the perspective is from a network node that is not in a lateral band. This process may extend from 1006 of FIG. 10. At 1302, a communication may be received using a non-lateral routing method (RPL), the communication intended for another network node. At 1304, in accordance with a determined route based on the supplemental routing information provided by an NMS, the communication may be routed to a preassigned gate node as an entrance to a preassigned lateral band using the non-lateral routing method.

Figure 14:
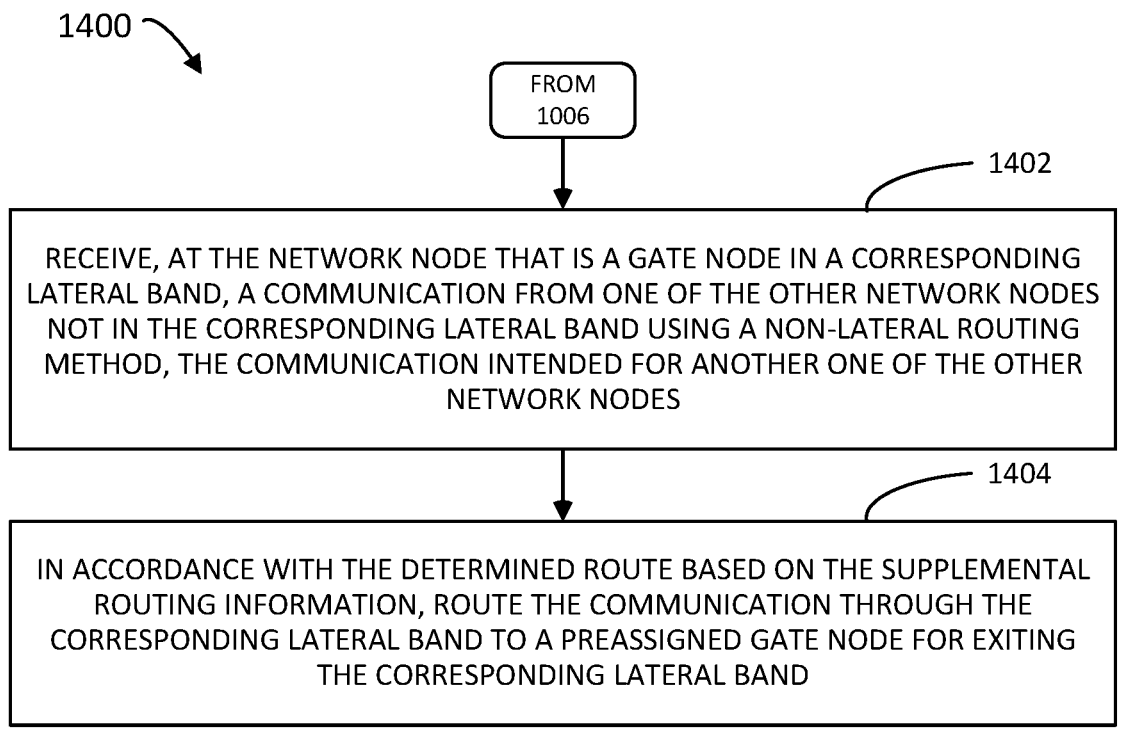

In example 1400 of FIG. 14, the perspective is from a network node that is a gate node in a lateral band that receives a communication from another network node that is not in the lateral band. This process may extend from 1006 of FIG. 10. At 1402, a communication may be received using a non-lateral routing method (RPL) from another network node not in the lateral band, the communication intended for yet another network node. At 1404, in accordance with a determined route based on the supplemental routing information provided by an NMS, the communication may be routed through the lateral band to a preassigned gate node for exiting the lateral band.

Figure 15:
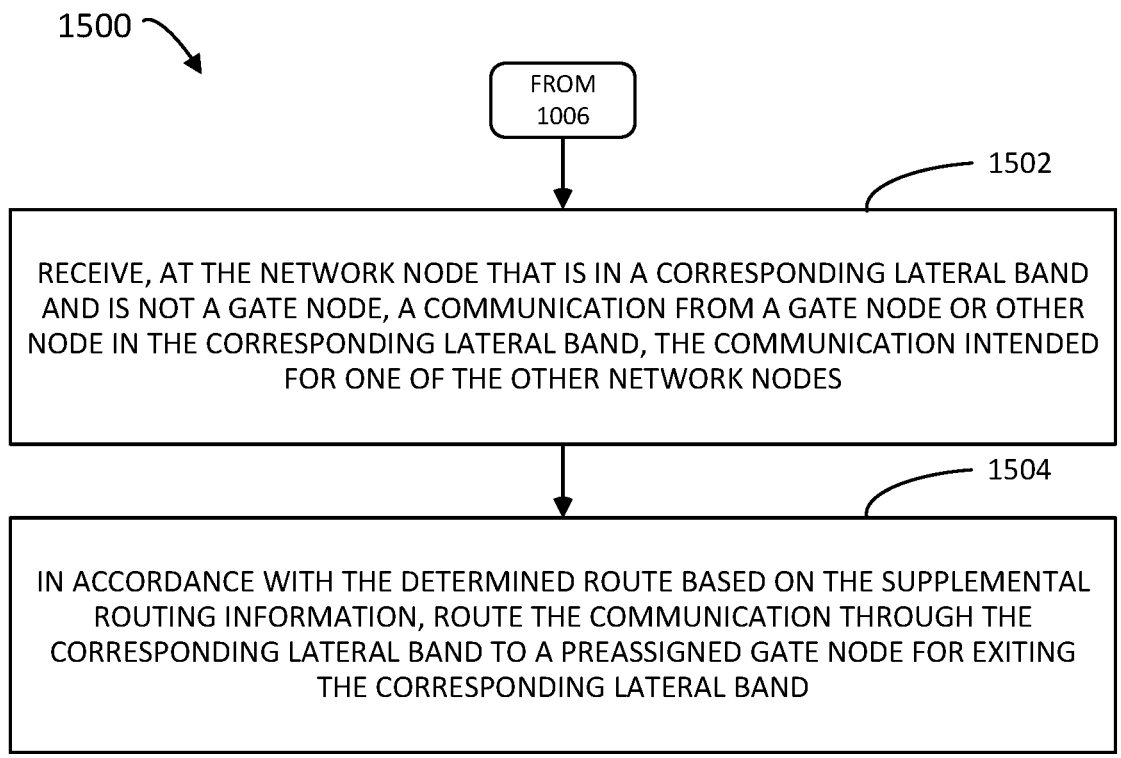

In example 1500 of FIG. 15, the perspective is from a network node that is in a lateral band but is not a gate node. This process may extend from 1006 of FIG. 10. At 1502, a communication may be received from a gate node or other node in the lateral band, the communication intended for another network node (e.g., not in the lateral band). At 1504, in accordance with a determined route based on the supplemental routing information provided by an NMS, the communication may be routed through the lateral band to a preassigned gate node for exiting the lateral band.

Figure 16:
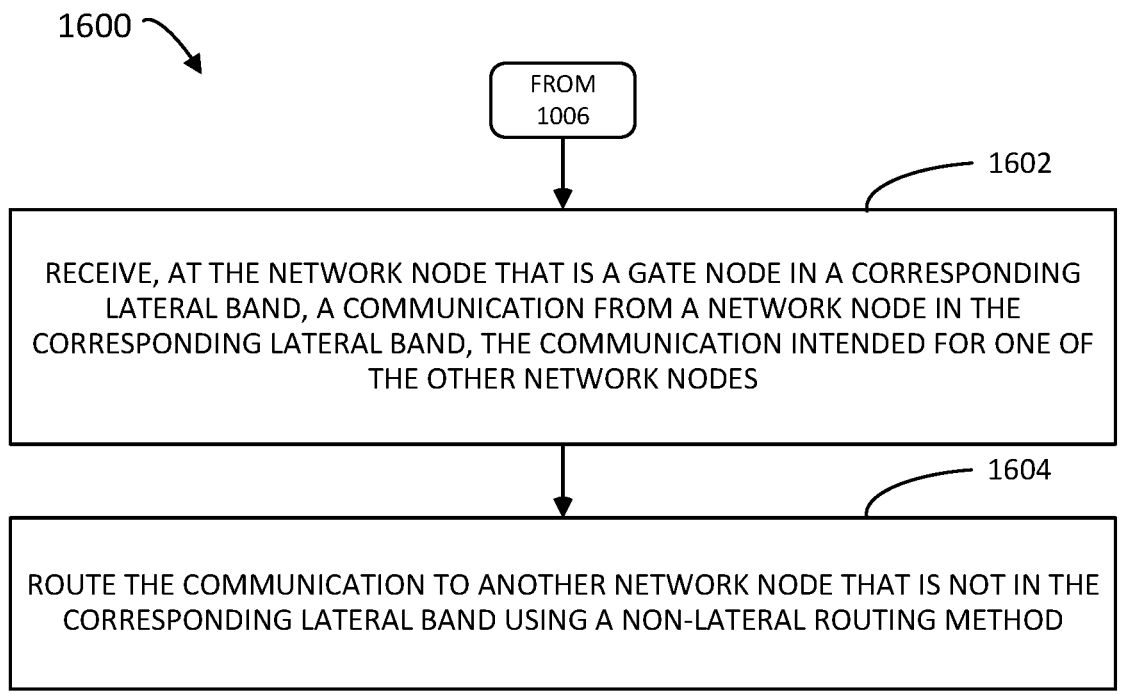

In example 1600 of FIG. 16, the perspective is from a network node that is a gate node in a lateral band that receives a communication from another network node in the lateral band. This process may extend from 1006 of FIG. 10. At 1602, a communication may be received from a network node in the lateral band, the communication intended for another network node (e.g., not in the lateral band). At 1604, the communication may be routed to another network node (e.g., the intended network node or yet another network node) that is not in the lateral band using a non-lateral routing method.

Figure 17:
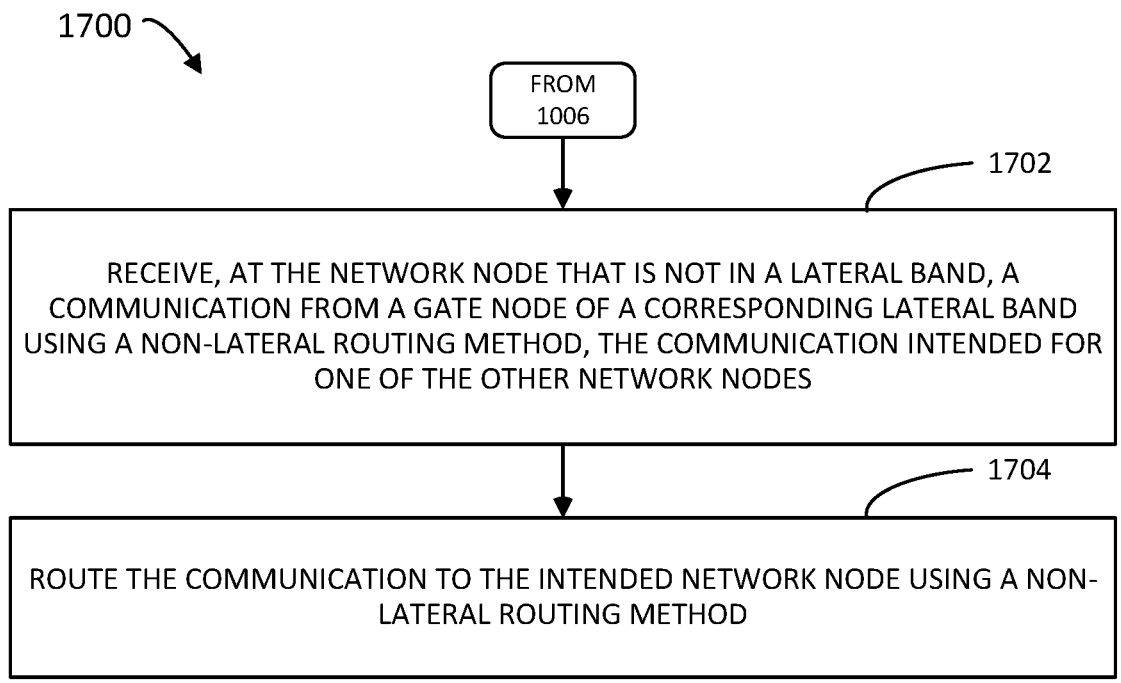

In example 1700 of FIG. 17, the perspective is from a network node that is not in a lateral band. This process may extend from 1006 of FIG. 10. At 1702, a communication may be received from a gate node of a lateral band using a non-lateral routing method, the communication intended for another network node. At 1704, the communication may be routed to the intended network node using a non-lateral routing method.

Example Environment(s)/Device(s)

Figure 18:
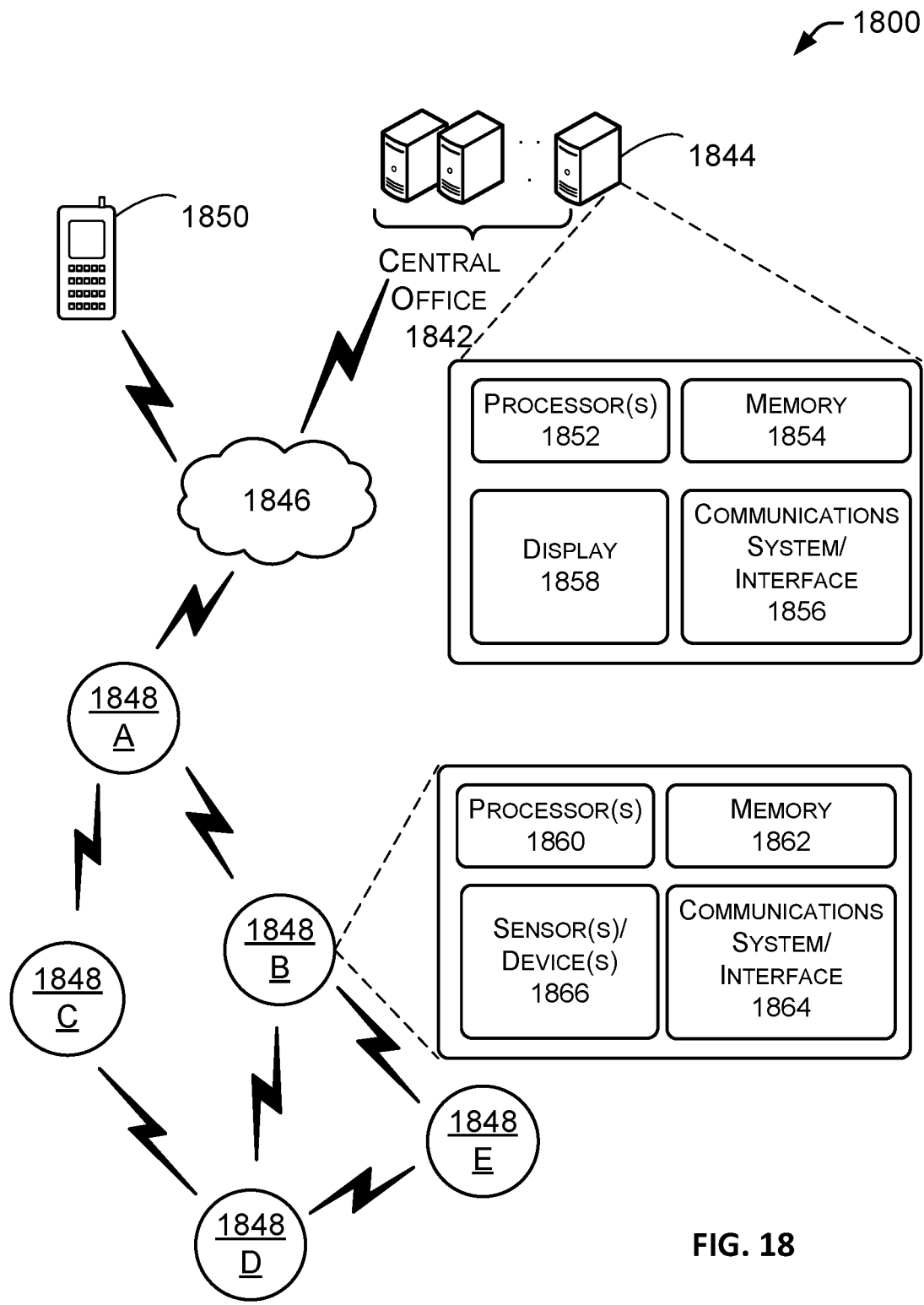
FIG. 18 is an illustration of an example network environment in which example methods, apparatus, and articles of manufacture disclosed herein may be implemented, according to embodiments of the present disclosure.

FIG. 18 is an illustration of an example network environment in which methods, apparatus, and articles of manufacture disclosed herein may be implemented, according to embodiments of the present disclosure. For example, an endpoint device (or node) 302/402/702/802/1848 may be a part of an advanced communication system (e.g., a telecommunication system, an advanced meter reading (AMR) network or an advanced metering infrastructure (AMI) network, an Internet of Things (IoT)-based network, etc.), such as data collection network 1800 of FIG. 18, according to embodiments. Data collection network 1800 may include a central office 1842, which may be associated with a data collection/processing entity (e.g., a utility company, in the case of an AMR or AMI network). The central office may include one or more central computing (or head-end) device(s) 1844 that may communicate with network nodes through one or more networks 1846, which may be the Internet or other network having widespread or local functionality. Network nodes may include nodes 1848A-1848E (collectively, nodes 1848), which may include, for example, endpoint devices such as utility meters (e.g., gas meters, water meters, electric meters, etc.), other devices related to a utility network (e.g., relays, repeaters, routers, transformers, or any such utility network computing device), or other communication devices, including those that may comprise or be associated with sensors, actuators, etc. These nodes may be located at various locations (e.g., homes, businesses, etc.). Nodes 1848A-1848E may be configured in a mesh network, star network or other configuration. While only five nodes 1848 are illustrated for simplicity, there may be any number of network nodes. One or more of the network nodes (e.g., device 1848A) may be a data collector and/or concentrator that may be configured for communication (e.g., radio frequency (RF) communication, cellular communication, etc.) with a plurality of downstream nodes 1848B-1848E, which may also be configured for similar communications. In an embodiment, device 1848A may be a root node. In an example operation, data collector 1848A may send and/or receive data or other communications to and/or from nodes 1848B-1848E to be provided to a data collection (or head-end) device 1844 (which may be located at central office 1842), and/or a mobile data collection (or head-end) device 1850. For example, in an AMR or AMI network, data collector 1848A may collect data from nodes 1848B-1848E that may include consumption data or other information associated with a utility meter (e.g., a gas meter, a water meter, an electricity meter, etc.). Additionally, data collector 1848A may send software updates, firmware updates, configuration updates, instructions or other information (which may have been communicated to data collector 1848A from data collection device 1844 or 1850, for example) to one or more of the nodes 1848B-1848E. In an embodiment, one or more network nodes (e.g., nodes 1848A-1848E) may be powered by a battery.

In an expanded view, data collection device 1844 (and/or mobile data collection device 1850) may include, among other components, one or more controllers or processors 1852, a memory 1854, one or more communication systems and/or interfaces 1856 (e.g., configured for RF communications, cellular communications, and/or another type of communications), and optionally a display 1858. Nodes 1848 may include, among other components, one or more controllers or processors 1860, a memory 1862, one or more communication systems and/or interfaces 1864 (e.g., configured for RF communications, cellular communications, and/or another type of communications), and one or more sensors/devices 1866, which may include, for example, one or more measurement sensors or other devices (e.g., meter(s), actuator(s), light(s), etc.).

One or more features disclosed herein may be implemented in hardware, software, firmware, and/or combinations thereof, including discrete and integrated circuit logic, application specific integrated circuit (ASIC) logic, field-programmable gate array (FPGA) logic, programmable logic controller (PLC) logic, and microcontrollers, and may be implemented as part of a domain-specific integrated circuit package, or a combination of integrated circuit packages. The terms software and firmware, as may be used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, over an electromagnetic wave guide, over a fiber optic cable, through a local or wide area network, through a personal area network (PAN), through a field area network (FAN), or through a network such as the Internet. An example of a non-transitory computer readable medium may be a compact disk, a flash memory, SRAM, DRAM, a hard drive, a solid state drive, or other data storage device.

A processing platform of a data collection device (e.g., data collection device 1844 or mobile data collection device 1850 of FIG. 18), and/or a node (e.g., any of devices 1848) may be embodied in any type of mobile and/or non-mobile computing device. Examples of mobile devices may include, but are not to be limited to, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices (e.g., utility meters or other sensors or devices), etc.

Figure 19:
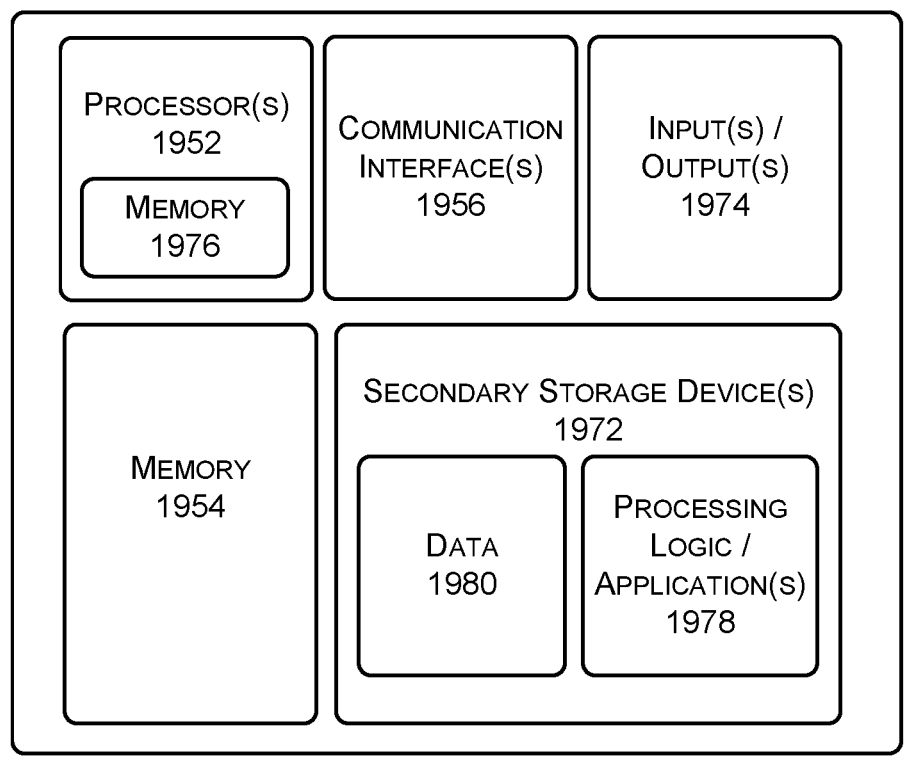
FIG. 19 is a block diagram showing various components of an example data collection device (e.g., device 1844 or device 1850 of FIG. 18), according to an embodiment of the present disclosure.

FIG. 19 is a block diagram of an example processing platform 1900 of a mobile or non-mobile data collection device (e.g., device(s) 1844, 1850), according to embodiments. A data collection device may act as a head-end device (e.g., a computing device associated with a central office 1842). Processing platform 1900 may include one or more processors 1952, memory 1954, one or more secondary storage devices 1972, one or more input/output ports or devices 1974, and/or one or more communication interfaces 1956, in communication via a bus, line, or similar implementation (not shown). Processing platform 1900 may also include a power supply (not shown), which may include an interface to an electricity source and/or may include one or more batteries.

Processor(s) 1952 may be implemented by, for example but not limitation, one or more integrated circuits, one or more ASIC, FPGA, PLC, or programmable logic device (PLD) circuits, logic circuits, microprocessors, controllers, etc. Processor(s) 1952 may include a local memory 1976 (e.g., a cache), an arithmetic logic unit (ALU), an internal or external bus controller, an internal register file, a floating point unit, a digital signal processer (DSP), an interrupt controller, and/or a memory management unit (MMU). Memory 1954 may include a volatile and/or a non-volatile memory. Volatile memory may be implemented by, for example but not limitation, Static RAM (SRAM), Dynamic RAMs (DRAMS) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 1954 may be controlled by a memory controller (not shown).

Data stored in memory 1954 and/or local memory 1976 may be used by processor(s) 1952 to facilitate data collection functions and/or communications, calculations/computations (e.g., if not done at the node device(s) or elsewhere), route determinations, etc., according to embodiments of this disclosure.

Input/output port(s)/device(s) 1974 may allow a user or an external device to interface with processor(s) 1952. Input devices may allow a user to enter data and/or commands for processor(s) 1952. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices such as display device 1858. Examples of other display devices may include a light emitting diode (LED), an organic light emitting diode (OLED), a liquid crystal display, a cathode ray tube display (CRT), a touchscreen, a tactile output device, a printer, speakers, etc. User interface screens may be displayed on a display device. The input/output port(s)/device(s) may be connected to processor(s) 1952, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1956 may be implemented in hardware or a combination of hardware and software, and may provide wired or wireless network interface(s) to one or more networks, such as network(s) 1846 of FIG. 18. Communication interface(s) 1956 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 1846. In an embodiment, security mechanisms may be used to provide secure communications, as would be understood by one of ordinary skill in the art.

Secondary storage device(s) 1972 may store processing logic 1978 (e.g., software) to be executed by processor(s) 1952, and/or may store data 1980. Processing logic 1978 and data 1980 may be used by processor(s) 1952 to facilitate data collection functions and/or communications between devices, calculations/computations (e.g., if not done at the node device(s) or elsewhere), etc., according to embodiments of this disclosure. Processing logic 1978 may include instructions for executing the methodology described herein for data communications and processing, for example, which may also include data packet generation/processing, configuration management and/or routing determinations. Processing logic may also include applications (or agents or features). Examples of secondary storage device(s) 1972 may include one or more hard drive disks, including but not limited to electro-mechanical hard drives and FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1972.

Figure 20:
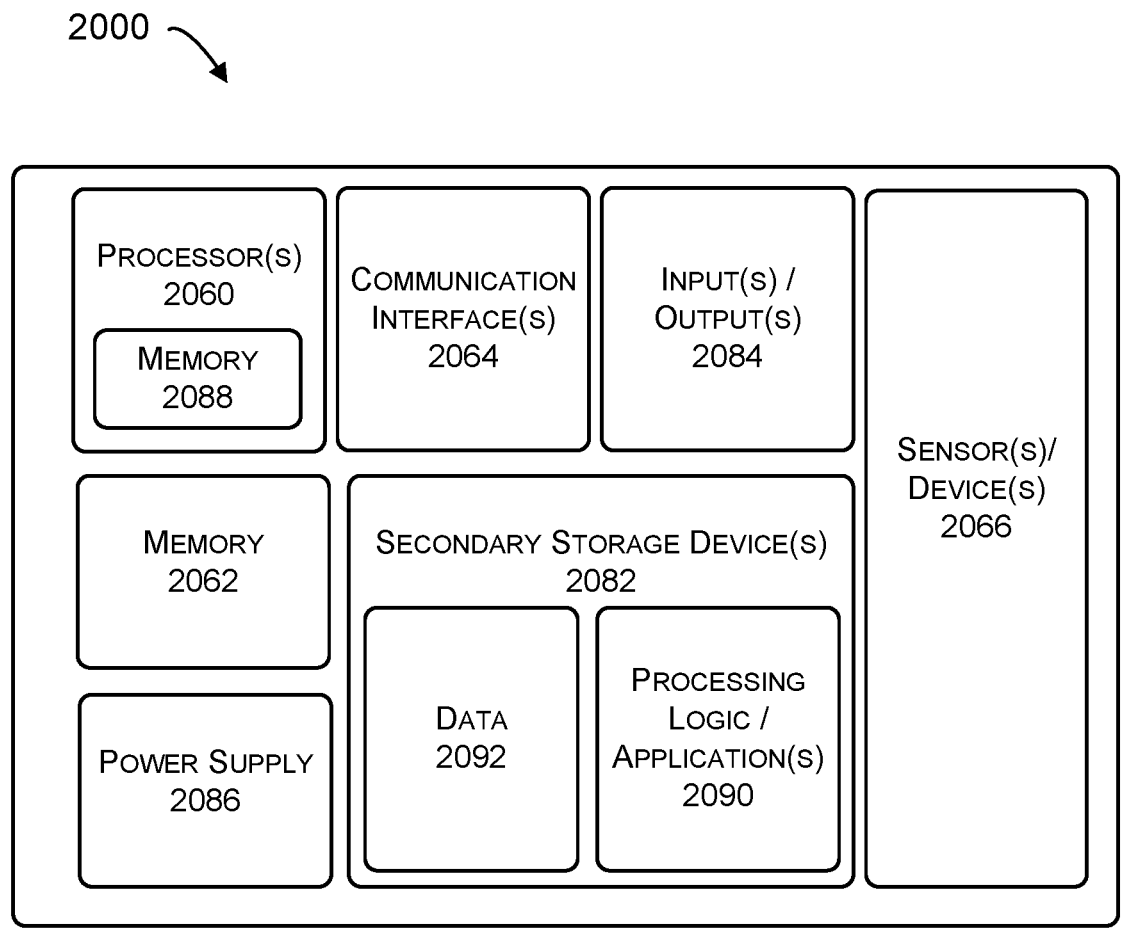
FIG. 20 is a block diagram showing various components of an example network node (e.g., one of devices 1848 of FIG. 18), according to an embodiment of the present disclosure.

FIG. 20 is a block diagram of an example processing platform 2000 of a node device (e.g., 1848), according to embodiments. Processing platform 2000 may include one or more processors 2060, memory 2062, one or more secondary storage devices 2082, one or more input/output ports or devices 2084, and/or one or more communication interfaces 2064, in communication via a bus, line, or similar implementation (not shown). Processing platform 2000 may also include a power supply 2086, which may include an interface to an electricity source and/or may include one or more batteries. Platform 2000 may also include one or more sensors/devices 2066, which may include, for example, one or more measurement sensors or other devices (e.g., meter(s), actuator(s), light(s), etc.).

Processor(s) 2060 may be implemented by, for example but not limitation, one or more integrated circuits, one or more ASIC, FPGA, PLC, or PLD circuits, logic circuits, microprocessors, controllers, etc. Processor(s) 1960 may include a local memory 1988 (e.g., a cache), an ALU, an internal or external bus controller, an internal register file, a floating point unit, a DSP, an interrupt controller, and/or a MMU. Memory 2062 may include a volatile and/or a non-volatile memory. Volatile memory may be implemented by, for example but not limitation, Static RAM (SRAM), Dynamic RAMs (DRAMS) of any type, including but not limited to: Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 2062 may be controlled by a memory controller (not shown). Data stored in memory 2062 and/or local memory 2088 may be used by processor(s) 2060 to facilitate data collection functions, calculations/computations, metering functions and/or metering calculations/computations (if embodied in a utility meter), route determinations, and/or communications, etc., according to embodiments of this disclosure.

Input/output port(s)/device(s) 2084 may allow a user or an external device to interface with processor(s) 2060. Input devices may allow a user to enter data and/or commands for processor(s) 2060. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output port(s)/device(s) 2084 may be connected to processor(s) 2060, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 2064 may be implemented in hardware or a combination of hardware and software, and may provide wired or wireless network interface(s) to one or more networks, such as network(s) 1846 of FIG. 18. Communication interface(s) 2064 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 1846. In an embodiment, security mechanisms may be used to provide secure communications, as would be understood by one of ordinary skill in the art.

Secondary storage device(s) 2082 may store processing logic 2090 (e.g., software) to be executed by processor(s) 2060, and/or may store data 2092. Processing logic 2090 and data 2092 may be used by processor(s) 2060 to facilitate sensor data collection functions, metering functions and/or metering calculations/computations if embodied in a utility meter, and/or communications between devices, etc., according to embodiments of this disclosure. Processing logic 2090 may include instructions for executing the methodology described herein, which may also include data packet generation/processing, configuration management and/or routing determinations. Processing logic may also include applications (or agents or features). Examples of secondary storage device(s) 2082 may include one or more hard drive disks, including but not limited to electro-mechanical hard drives and FLASH memory hard drives (SSDs), compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 2082.

The foregoing description discloses techniques for providing efficient routing in a communication network while minimizing network congestion of typical ad-hoc routing methods. The techniques described herein may apply to any network of nodes that could benefit from lateral node-to-node communications, as opposed to relying strictly on the use of vertical communications via a root node or relying on currently known point-to-point routing. Examples of communications that may benefit from the techniques described herein include distributed intelligence (DI) applications as well as firmware and/or software download, where distribution may be shared among the nodes and missing packets may be obtained from nearby nodes rather than being re-sent from a head-end system. While the techniques described herein apply well in mesh communication networks, the principles may also provide a benefit in other types of networks.

The versatility of using lateral routing in combination with known vertical routing methods may provide an optimal solution that reaps the benefits of both. The solutions presented herein may allow communications to alleviate congestion (e.g., near a root node or in odd-shaped topologies) and avoid chokepoints that may exist in a network, likely providing a savings of time and cost as well as network resources.

The particular examples used in this document are for ease of understanding and are not to be limiting. The description herein is, at times, directed to utility metering (e.g., of gas, water, electricity, etc.). However, systems and techniques described herein may be used in many other contexts that may or may not involve utility metering (e.g., various network communication systems, IoT networks, LOWPAN networks, WSN networks, etc.). As would be understood by one of ordinary skill in the art, the network bandwidth-saving features and other features discussed herein may be beneficial in any communication system, including many other systems and technology spaces that may involve communications (e.g., industrial manufacturing, mining, agriculture, transportation, etc.), including in fields yet unknown.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A network node, comprising:
   a processor;
   a transceiver communicably coupled with the processor, the transceiver configured to communicate over a network with a network management server and with one or more other network nodes; and
   a memory communicably coupled with the processor, the memory storing instructions that, when executed by the processor, direct the processor to:
      send current routing information of the network node to the network management server;
      receive supplemental routing information from the network management server, the supplemental routing information determined by the network management server based on the current routing information of the network node and current routing information provided to the network management server from the one or more other network nodes, and the supplemental routing information including lateral route information identifying designated routing nodes of the network nodes, the designated routing nodes forming one or more defined lateral bands of nodes that each horizontally span the network; and
      determine, based on the supplemental routing information, a route to one or more of the other network nodes.

2. The network node of claim 1, wherein the designated routing nodes include designated routing nodes selected to handle traffic through a network chokepoint.

3. The network node of claim 1, wherein at least one of the lateral bands is formed to create a route to direct communications through a chokepoint or other abnormal topological layout.

4. The network node of claim 1, wherein the designated routing nodes include gate nodes selected as entrance or exit points of corresponding lateral bands from or to network nodes that are not in the corresponding lateral bands.

5. The network node of claim 4, wherein the network node is a gate node, and the instructions further direct the processor to:
   inform neighboring nodes of the network node that the network node is a gate node.

6. The network node of claim 4, wherein the determined route to at least one of the network nodes includes:
   routing from a first network node that is not in a lateral band to a first preassigned gate node as an entrance to a preassigned lateral band using a non-lateral routing method;
   routing from the first preassigned gate node through the preassigned lateral band to a second preassigned gate node as an exit of the preassigned lateral band in accordance with a predetermined lateral route; and
   routing from the second preassigned gate node to a second network node that is not in the preassigned lateral band using the non-lateral routing method.

7. The network node of claim 4, wherein the network node is an intended receiving node of a future communication, and the instructions further direct the processor to:
   broadcast a message through the network of network nodes indicating which lateral band, and what first gate node on that lateral band, should be used for a communication to the network node; and receive a test packet from a sending node that used the indicated lateral band and first gate node to reach the network node, the test packet including an indication of a second gate node of the lateral band that the test packet used to enter the lateral band, thereby identifying the lateral band and gate nodes needed for the future communication between the sending node and the receiving node.

8. The network node of claim 4, wherein the network node is not in a lateral band, and wherein the instructions further direct the processor to:

receive a communication for one of the other network nodes using a non-lateral routing method; and in accordance with the determined route based on the supplemental routing information, route the communication to a preassigned gate node as an entrance to a preassigned lateral band using the non-lateral routing method.

9. The network node of claim 4, wherein the network node is a gate node in a corresponding lateral band, and wherein the instructions further direct the processor to:

receive a communication from one of the other network nodes not in the corresponding lateral band using a non-lateral routing method, the communication intended for another one of the other network nodes;

in accordance with the determined route based on the supplemental routing information, route the communication through the corresponding lateral band to a preassigned gate node for exiting the corresponding lateral band.

10. The network node of claim 4, wherein the network node is in a corresponding lateral band and is not a gate node, and wherein the instructions further direct the processor to, in accordance with the determined route based on the supplemental routing information:

receive a communication from a gate node or other node in the corresponding lateral band, the communication intended for one of the other network nodes; and route the communication through the corresponding lateral band to a preassigned gate node for exiting the corresponding lateral band.

11. The network node of claim 4, wherein the network node is a gate node in a corresponding lateral band, and wherein the instructions further direct the processor to:

receive a communication from a network node in the corresponding lateral band, the communication intended for one of the other network nodes; and route the communication to another network node that is not in the corresponding lateral band using a non-lateral routing method.

12. The network node of claim 4, wherein the network node is not in a lateral band, and wherein the instructions further direct the processor to:

receive a communication from a gate node of a corresponding lateral band using a non-lateral routing method, the communication intended for one of the other network nodes; and route the communication to the intended network node using the non-lateral routing method.

13. The network node of claim 4, wherein the gate nodes and their corresponding neighboring nodes form an exit drain, where the gate nodes inform their corresponding neighboring nodes of their lateral band exit point capability.

14. A method of determining, at a network node, a communication route to one or more other network nodes through a network, the method comprising:

sending current routing information of the network node to a network management server;

receiving supplemental routing information from the network management server, the supplemental routing information determined by the network management server based on the current routing information of the network node and current routing information provided to the network management server from the one or more other network nodes, and the supplemental routing information including lateral route information identifying designated routing nodes of the network nodes, the designated routing nodes forming one or more defined lateral bands of nodes that each horizontally span the network; and determining, based on the supplemental routing information, a route to one or more of the other network nodes.

15. The method of claim 14, wherein the network node is a gate node selected as one of one or more entry or exit points of a corresponding lateral band, and the method further includes:

informing neighboring nodes of the network node that the network node is a gate node.

16. The method of claim 14, wherein determining the route includes determining the route to at least one of the network nodes to include:

routing from a first network node that is not in a lateral band to a first preassigned gate node as an entrance to a preassigned lateral band using a non-lateral routing method;

routing from the first preassigned gate node through the preassigned lateral band to a second preassigned gate node as an exit of the preassigned lateral band in accordance with a predetermined lateral route; and routing from the second preassigned gate node to a second network node that is not in the preassigned lateral band using the non-lateral routing method.

17. The method of claim 14, wherein the network node is an intended receiving node of a future communication, the method further comprising:

broadcasting a message through the network of network nodes indicating which lateral band, and what first gate node to exit that lateral band, should be used for a communication to the network node; and receiving a test packet from a sending node that used the indicated lateral band and first gate node to reach the network node, the test packet including an indication of a second gate node of the lateral band that the test packet used to enter the lateral band, thereby identifying the lateral band and gate nodes needed for the future communication between the sending node and the receiving node.

18. The method of claim 14, wherein the network node is not in a lateral band, the method further comprising:

receiving a communication for one of the other network nodes using a non-lateral routing method; and in accordance with the determined route based on the supplemental routing information, routing the communication to a preassigned gate node as an entrance to a preassigned lateral band using the non-lateral routing method.

19. The method of claim 14, wherein the network node is a gate node in a corresponding lateral band, the method further comprising:

receiving a communication from one of the other network nodes not in the corresponding lateral band using a non-lateral routing method, the communication intended for another one of the other network nodes;

in accordance with the determined route based on the supplemental routing information, routing the communication through the corresponding lateral band to a preassigned gate node for exiting the corresponding lateral band.

20. The method of claim 14, wherein the network node is in a corresponding lateral band and is not a gate node, the method further comprising:

receiving a communication from a gate node or other node in the corresponding lateral band, the communication intended for one of the other network nodes; and in accordance with the determined route based on the supplemental routing information, routing the communication through the corresponding lateral band to a preassigned gate node for exiting the corresponding lateral band.

21. The method of claim 14, wherein the network node is a gate node in a corresponding lateral band, the method further comprising:

receiving a communication from a network node in the corresponding lateral band, the communication intended for one of the other network nodes; and routing the communication to another network node that is not in the corresponding lateral band using a non-lateral routing method.

22. The method of claim 14, wherein the network node is not in a lateral band, the method further comprising:

receiving a communication from a gate node of a corresponding lateral band using a non-lateral routing method, the communication intended for one of the other network nodes; and routing the communication to the intended network node using the non-lateral routing method.

23. At least one non-transitory computer-readable medium having computer program logic stored thereon, the computer program logic including instructions that, when executed by a processor of a network node device of a communications system, cause the processor to perform the method of claim 14.

* * * * *